US012744136B2

(12) United States Patent
Sugimoto et al.

(10) Patent No.: US 12,744,136 B2
(45) Date of Patent: Sep. 22, 2026

(54) PRECURSOR WIRE FOR COMPOUND SUPERCONDUCTING WIRE, COMPOUND SUPERCONDUCTING WIRE, AND REWINDING METHOD FOR COMPOUND SUPERCONDUCTING WIRE

(71) Applicant: FURUKAWA ELECTRIC CO., LTD., Tokyo (JP)

(72) Inventors: Masahiro Sugimoto, Tokyo (JP); Hiroyuki Fukushima, Tokyo (JP); Kiyoshige Hirose, Tokyo (JP); Daisuke Asami, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 14 days.

(21) Appl. No.: 18/681,071

(22) PCT Filed: Aug. 4, 2022

(86) PCT No.: PCT/JP2022/029931
§ 371 (c)(1),
(2) Date: Feb. 5, 2024

(87) PCT Pub. No.: WO2023/013726
PCT Pub. Date: Feb. 9, 2023

(65) Prior Publication Data

US 2024/0274327 A1 Aug. 15, 2024

(30) Foreign Application Priority Data

Aug. 6, 2021 (JP) ................................ 2021-130362

(51) Int. Cl.

| | |
|---|---|
| ***H01B 12/10*** | (2006.01) |
| ***H01B 12/06*** | (2006.01) |
| ***H01B 13/00*** | (2006.01) |

(52) U.S. Cl.
CPC ......... *H01B 12/06* (2013.01); *H01B 13/0003* (2013.01)

(58) Field of Classification Search
CPC ........................................................ H01B 12/10
(Continued)

(56) References Cited

U.S. PATENT DOCUMENTS 4,329,539 A * 5/1982 Tanaka .................. H10N 60/80 72/286
4,861,751 A * 8/1989 Tenhover ................. C23C 8/12 164/463

(Continued)

FOREIGN PATENT DOCUMENTS

CN 101517660 A 8/2009
EP 2071590 A1 6/2009

(Continued)

OTHER PUBLICATIONS

Yoshiaki Tanaka et al., "Microstructures and Critical Current Densities of Superconducting V3Ga Tapes Made by a Composite Process" Journal of the Japan Institute of Metals and Materials, vol. 40, 1976, No. 5, 515-521 Published in 1976.

(Continued)

*Primary Examiner* — Chau N Nguyen
(74) *Attorney, Agent, or Firm* — CKC & PARTNERS CO., LLC

(57) ABSTRACT

A precursor wire for compound superconducting wire includes: a compound superconducting precursor member configured by compound superconducting precursor filaments, and a first matrix precursor embedding the compound superconducting precursor filaments and including a first stabilizing material; a reinforcing member arranged at the outer circumferential side of the compound superconducting precursor member, and configured by reinforcing filaments,
(Continued)

and a second matrix embedding the reinforcing filaments and including a second stabilizing material; and a cylindrical stabilizing member arranged to at least one of the inner circumferential side or outer circumferential side of the reinforcing member, and consisting of a third stabilizing material, in which an aspect ratio Ab1 (Wb1/Tb1) of a width dimension Wb1 relative to a thickness dimension Tb1 of the compound superconducting precursor member in a cross section perpendicular to a longitudinal direction of the compound superconducting precursor member is 1.80 or more.

14 Claims, 9 Drawing Sheets

(58) Field of Classification Search
USPC ........................................................ 174/125.1
See application file for complete search history.

(56) References Cited

U.S. PATENT DOCUMENTS

| | | | | |
|---|---|---|---|---|
| 2018/0122534 | A1* | 5/2018 | Yoshihara | H01B 12/06 |
| 2022/0005632 | A1* | 1/2022 | Sugimoto | H10N 60/0128 |

FOREIGN PATENT DOCUMENTS

| | | | |
|---|---|---|---|
| EP | 3859755 A1 | | 8/2021 |
| JP | S53107296 A | | 9/1978 |
| JP | H04298917 A | | 10/1992 |
| JP | 2007173102 A | | 7/2007 |
| JP | 5718171 B2 | | 5/2015 |
| JP | 6155253 B2 | | 6/2017 |
| JP | 6182577 B2 | | 8/2017 |
| WO | WO 2020/066907 | * | 4/2020 |

OTHER PUBLICATIONS

P. Kovac, et al., " Ic anisotropy in flattened Nb3Sn superconductors and possible ways for overcoming it" Cryogenics, 35 (1995) , 83-86 Published in 1995.
M. Sugimoto, et al., "Nb-Rod-Method Cu—Nb/Nb3Sn Wires for Practical React-and-Wind Applications" IEEE Trans. Appl. Super. Vol. 28 No. 3 (2018) 6000105 Published on Apr. 2018.
M. Sugimoto, et al., "Performance of Polyvinyl Formal Insulated Cu—Nb/Nb3Sn Wires for React-and-Wind Process" IEEE Trans. Appl. Super. Vol. 29 No. 5 (2019) 6001205 Published on Aug. 2019.
Office Action issued Jul. 28, 2026 in the CN Patent Application No. 202280053948.6.

* cited by examiner

PRECURSOR WIRE FOR COMPOUND SUPERCONDUCTING WIRE, COMPOUND SUPERCONDUCTING WIRE, AND REWINDING METHOD FOR COMPOUND SUPERCONDUCTING WIRE

TECHNICAL FIELD

The present disclosure relates to a precursor wire for compound superconducting wire, a compound superconducting wire, and a method of rewinding a compound superconducting wire.

BACKGROUND ART

The Wind-and-React method (W&R Method) of conducting a compound generation and thermal treatment after winding a precursor wire for compound superconducting wire on a superconductor coil winding frame, is applied to the production of a superconducting magnet using a compound superconducting wire, for example a compound-based superconducting wire such as $Nb_3Sn$. This is because the compound-based superconducting wire obtained by thermal treatment is very susceptible to strain.

By the Wind-and-React method, in the case of manufacturing a large-scale magnet such as a high-magnetic field large-bore magnet using a compound superconducting wire of $Nb_3Sn$ or the like, it is necessary to perform the compound generation and thermal treatment for $Nb_3Sn$ generation in a furnace of a vacuum or inert gas atmosphere at a predetermined temperature of 600° C. or higher, and thus a large-scale thermal treatment device according to the magnet dimensions must be prepared.

In addition, there is the React-and-Wind Method (R&W Method) in which coil winds using a compound-based superconducting wire such as thermally treated $Nb_3Sn$. The React-and-Wind Method allows a degree of freedom in the material selection for the electrical insulation of the compound superconducting wire surface and for the coil member such as a winding frame, and further has an advantage of being able to adjust the strain in the compound superconducting wire after thermal treatment.

However, since the superconducting property of the compound superconducting wire will vary according to the state of strain in the compound superconducting wire of $Nb_3Sn$ or the like, it is necessary to precisely take into consideration the state of the strain of the compound superconducting wire. For example, when the compound superconducting wire receives damage by strain due to force applied externally to the compound superconducting wire after thermal treatment, the compound superconducting wire receives compressive residual strain by the difference in thermal contraction of materials composited upon cooling, and the compound superconducting wire receiving tensile strain or transverse compressive strain from electromagnetic force during coil operation, the superconducting properties such as critical current of the compound superconducting wire may decline. Thus far, many technical developments have been carried out to address this issue.

For example, Patent Document 1 forms a laminated conductor using a rectangular compound superconductor having magnetic field anisotropy of the critical current, and improves coil performance by suppressing critical current anisotropy. However, since it does not necessarily improvement the properties of the rectangular compound superconductor itself, the conductor design and coil design using this are limited, and it is difficult to obtain drastic performance improvements in critical current.

In addition, Patent Document 2 suppresses flattening of filaments when processing into a rectangular shape by softening the copper alloy around a filament and arranging an alumina dispersion copper tube, and suppresses the magnetic field anisotropy of the critical current density. However, this technology is not technology for improving the critical current density itself of a flattened filament shape.

In addition, Patent Document 3 discloses a processing method for obtaining a favorable filament shape in a rectangular wire.

The conventional technologies represented in the above Patent Documents 1 to 3 are related to conductor structures made considering magnetic field anisotropy of critical current in a compound superconducting wire having a rectangular shape in order to prevent a decline in the energization characteristic of a coil, and to the structure and processing method for suppressing abnormal deformation at the part which becomes superconductor inside the compound superconducting wire accompanying processing into a rectangular shape. In particular, sufficient effects are not obtained as a technology to be applied to the superconducting coil that are wound by the React-and-Wind method performing the winding operation after compound generation and thermal treatment. For this reason, with the React-and-Wind method, in view of the risk of a performance decline of the superconducting coil occurring, it is necessary to increase the operating margin of the superconducting coil, and thus suppressing an increase in the amount of wire used and increase in production cost is an issue.

In addition, Patent Documents 4 to 6 describe compound superconducting wires suited to the React-and-Wind method, and practical winding methods of adjusting the bending strain during winding.

In the case of applying the technologies of Patent Documents 4 to 6 to actual coils and bending into a small diameter, a method of reducing the wire element outside diameter to reduce the strain received by the compound superconducting member has been carried out. As a result thereof, since the critical current per wire element becomes small, the production time of the coils may increase, while increasing the wire winding length of the coil. Furthermore, in a method which establishes a conductor by twisting together a plurality of wire elements having small outside diameter, the workload increases as the number of twists increases, and thus the critical current per cross-sectional area of the twisted conductor including voids may decline.

In addition, Non-patent Document 1 describes a mechanism of the superconducting properties such as critic current property expressing external magnetic field anisotropy, by flattening the compound superconducting wire. Non-patent Document 2 describes anisotropy of wire having an aspect ratio of about 5, and proposes a conductor structure for avoiding this anisotropy. In addition, Non-patent Documents 3 and 4 describe design examples of compound superconducting wires suited to coils wound by the React-and-Wind method, and the properties thereof. However, there remains to be mentioned that there are requirements of designing with a predetermined structure according to the required characteristics, manufacturing by a predetermined processing method, and being used in a predetermined method in order to obtain a compound superconducting wire satisfying the required characteristics of individual superconducting magnets. What is discussed by these non-patent documents is considered to be the possibility of obtaining a compound superconducting wire capable of coil production by the highly reliable React-and-Wind method by comprehensively optimizing the wire structure, production method and usage method.

In this way, the conventionally proposed compound-based superconducting wire of Patent Documents 1 to 3, as mentioned above, are technologies for conductor structures for mitigating external magnetic field anisotropy of the rectangular wire, and suppressing flattening deformation of the superconducting member in order to suppress anisotropy. In addition, while Non-patent Documents 1 and 2 show characteristic data for anisotropy of compound superconductors, there is no mention of the characteristics when applying such technology to the React-and-Wind method. In addition, although Patent Documents 4 to 6 and Non-patent Documents 3 and 4 describe the structures suited to the React-and-Wind method, or usage thereof, there remains the disclosure of technology involving reducing the outside diameter for bending in a small diameter and twisting a plurality of wire elements to increase critical current. On the other hand, in the case of applying the compound superconducting wire not compositing a reinforcing material to the actual magnet production using the React-and-Wind method, since the reliability of the wire itself is low, the performance as a magnet cannot be accurately predicted. For this reason, it is necessary to make a magnet design with high operating safety factor, and there is a problem in that it becomes high cost due to an increase in the current carrying capacity margin of wires, or increase in wire length, and due to enlargement of the coil itself or cooling system, and thus it has not yet been put to practical use on a commercial basis.

CITATION LIST

Patent Document

Patent Document 1: Japanese Unexamined Patent Application, Publication No. S53-107296

Patent Document 2: Japanese Unexamined Patent Application, Publication No. H4-298917

Patent Document 3: Japanese Unexamined Patent Application, Publication No. 2007-173102

Patent Document 4: Japanese Patent No. 5718171

Patent Document 5: Japanese Patent No. 6155253

Patent Document 6: Japanese Patent No. 6182577

Non-Patent Document

Non-Patent Document 1: Yoshiaki Tanaka et al.; "Microstructures and Critical Current Densities of Superconducting $V_3Ga$ Tapes Made by a Composite Process", Journal of Japan Institute of Metals and Materials, Vol. 40 (1976), pp. 515-521

Non-Patent Document 2: P. Kovac, et al.; "Ic anisotropy in flattened $Nb_3Sn$ superconductors and possible ways for overcoming it", Cryogenics, 35 (1995), 83-86

Non-Patent Document 3: M. Sugimoto, et al.; "Nb-Rod-Method Cu—Nb/$Nb_3Sn$ Wires for Practical React-and-Wind Applications", IEEE Trans. Appl. Super. Vol. 28 No. 3 (2018) 6000105

Non-Patent Document 4: M. Sugimoto, et al.; "Performance of Polyvinyl Formal Insulated Cu—Nb/$Nb_3Sn$ Wires for React-and-Wind Process", IEEE Trans. Appl. Super. Vol. 29 No. 5 (2019) 6001205

DISCLOSURE OF THE INVENTION

Problems to be Solved by the Invention

An object of the present disclosure is to provide a precursor wire for compound superconducting wire and a compound superconducting wire enabling coil production on a commercial basis, superior in windability into a small diameter, and having high critical current, as well as a rewinding method for the compound superconducting wire.

Means for Solving the Problems

According to a first aspect of the present invention, a precursor wire for compound superconducting wire, includes: a compound superconducting precursor member configured by a plurality of compound superconducting precursor filaments, and a first matrix precursor embedding the plurality of compound superconducting precursor filaments and including a first stabilizing material; a cylindrical reinforcing member arranged at the outer circumferential side of the compound superconducting precursor member, and configured by a plurality of reinforcing filaments, and a second matrix embedding the plurality of reinforcing filaments and including a second stabilizing material; and a cylindrical stabilizing member arranged to at least one of the inner circumferential side or outer circumferential side of the reinforcing member, and consisting of a third stabilizing material, in which an aspect ratio Ab1 (Wb1/Tb1) of a width dimension Wb1 of the compound superconducting precursor member relative to a thickness dimension Tb1 of the compound superconducting precursor member in a cross section perpendicular to a longitudinal direction of the compound superconducting precursor member is 1.80 or more.

According to a second aspect of the present invention, in the precursor wire for compound superconducting wire as described in the first aspect, the aspect ratio Ab1 is 11.00 or less.

According to a third aspect of the present invention, in the precursor wire for compound superconducting wire as described in the first or second aspect, the aspect ratio Ab1 is 2.00 or more and 10.00 or less.

According to a fourth aspect of the present invention, in the precursor wire for compound superconducting wire as described in any one of the first to third aspects, a total cross-sectional area of a cross-sectional area of the compound superconducting precursor member, cross-sectional area of the reinforcing member and cross-sectional area of the stabilizing member in a cross section perpendicular to the longitudinal direction of the precursor wire for compound superconducting wire is 0.40 $mm^2$ or more and 4.00 $mm^2$ or less.

According to a fifth aspect of the present invention, in the precursor wire for compound superconducting wire as described in any one of the first to fourth aspects, the compound superconducting precursor filament is Nb, and the precursor wire for compound superconducting wire further comprises an Sn diffusion prevention member consisting of Nb or Ta, or an alloy or composite material thereof arranged between the compound superconducting precursor member and the reinforcing member.

According to a sixth aspect of the present invention, in the precursor wire for compound superconducting wire as described in any one of the first to fifth aspects, the first stabilizing material is copper or a copper alloy, the reinforcing filament is one metal selected from the group consisting of Nb, Ta, V, W, Mo, Fe, Ti and Hf, or an alloy configured by two or more of these metals, the second stabilizing material is copper or a copper alloy, and the third stabilizing material is copper or a copper alloy.

According to a seventh aspect of the present invention, a compound superconducting wire includes: a compound superconducting member configured by a plurality of compound superconducting filaments including a compound superconducting phase, and a first matrix embedding the plurality of compound superconducting filaments and including a first stabilizing material; a cylindrical reinforcing member arranged at the outer circumferential side of the compound superconducting member, and configured by a plurality of reinforcing filaments, and a second matrix embedding the plurality of reinforcing filaments and including a second stabilizing material; and a cylindrical stabilizing member arranged to at least one of the inner circumferential side or outer circumferential side of the reinforcing member, and consisting of a third stabilizing material, in which an aspect ratio Ab2 (Wb2/Tb2) of a width dimension Wb2 of the compound superconducting member relative to a thickness dimension Tb2 of the compound superconducting member in a cross section perpendicular to a longitudinal direction of the compound superconducting member is 1.80 or more.

According to an eighth aspect of the present invention, in the compound superconducting wire as described in the seventh aspect, the aspect ratio Ab2 is 11.00 or less.

According to a ninth aspect of the present invention, in the compound superconducting wire as described in the seventh or eighth aspect, the aspect ratio Ab2 is 2.00 or more and 10.00 or less.

According to a tenth aspect of the present invention, in the compound superconducting wire as described in any one of the seventh to ninth aspects, a total cross-sectional area of a cross-sectional area of the compound superconducting member, cross-sectional area of the reinforcing member and cross-sectional area of the stabilizing member in a cross section perpendicular to the longitudinal direction of the compound superconducting wire is 0.40 $mm^2$ or more and 4.00 $mm^2$ or less.

According to an eleventh aspect of the present invention, in the compound superconducting wire as described in any one of the seventh to tenth aspects, the compound superconducting phase is $Nb_3Sn$, and the compound superconducting wire further includes an Sn diffusion prevention member consisting of Nb or Ta, or an alloy or composite material thereof arranged between the compound superconducting member and the reinforcing member.

According to a twelfth aspect of the present invention, in the compound superconducting wire as described in any one of the seventh to eleventh aspects, the first stabilizing material is copper or a copper alloy, the reinforcing filament is one metal selected from the group consisting of Nb, Ta, V, W, Mo, Fe, Ti and Hf, or an alloy configured by two or more of these metals, the second stabilizing material is copper or a copper alloy, and the third stabilizing material is copper or a copper alloy.

According to a thirteenth aspect of the present invention, the compound superconducting wire as described in any one of the seventh to twelfth aspects further includes an electrical insulation member containing a resin arranged at an outermost circumference.

According to a fourteenth aspect of the present invention, a method of rewinding a compound superconducting wire as described in any one of the seventh to thirteenth aspects includes when rewinding the compound superconducting wire from a first winding member to a second winding member, extending the compound superconducting wire from the first winding member in a tangential direction of the first winding member, and winding the compound superconducting wire onto the second winding member while bending in a bending direction which is the same as when being wound onto the first winding member.

Effects of the Invention

According to the present disclosure, it is possible to provide a precursor wire for compound superconducting wire and a compound superconducting wire enabling coil production on a commercial basis, superior in windability into a small diameter, and having high critical current, as well as a rewinding method for the compound superconducting wire.

PREFERRED MODE FOR CARRYING OUT THE INVENTION

Hereinafter, the present invention will be explained in detail based on embodiments.

The present inventors, as a result of conducting rigorous research to enable use by bending into a small diameter and increase the critical current per unit, found that coil production on a commercial basis was enabled and the windability into a small diameter and critical current improved compared to conventional, by focusing on the structure of a compound superconducting precursor member of a precursor wire for compound superconducting wire and compound superconducting member of a compound superconducting wire, and based on this knowledge arrived at completing the present disclosure.

A precursor wire for compound superconducting wire according to an embodiment includes: a compound superconducting precursor member configured by a plurality of compound superconducting precursor filaments, and a first matrix precursor embedding the plurality of compound superconducting precursor filaments and including a first stabilizing material; a cylindrical reinforcing member arranged at the outer circumferential side of the compound superconducting precursor member, and configured by a plurality of reinforcing filaments, and a second matrix embedding the plurality of reinforcing filaments and including a second stabilizing material; and a cylindrical stabilizing member arranged to at least one of the inner circumferential side or outer circumferential side of the reinforcing member, and consisting of a third stabilizing material, in which an aspect ratio Ab1 (Wb1/Tb1) of a width dimension Wb1 of the compound superconducting precursor member relative to a thickness dimension Tb1 of the compound superconducting precursor member in a cross section perpendicular to a longitudinal direction of the compound superconducting precursor member is 1.80 or more.

A compound superconducting wire according to an embodiment includes: a compound superconducting member configured by a plurality of compound superconducting filaments including a compound superconducting phase, and a first matrix embedding the plurality of compound superconducting filaments and including a first stabilizing material; a cylindrical reinforcing member arranged at the outer circumferential side of the compound superconducting member, and configured by a plurality of reinforcing filaments, and a second matrix embedding the plurality of reinforcing filaments and including a second stabilizing material; and a cylindrical stabilizing member arranged to at least one of the inner circumferential side or outer circumferential side of the reinforcing member, and consisting of a third stabilizing material, in which an aspect ratio Ab2 (Wb2/Tb2) of a width dimension Wb2 of the compound superconducting member relative to a thickness dimension Tb2 of the compound superconducting member in a cross section perpendicular to a longitudinal direction of the compound superconducting member is 1.80 or more.

Figure 1:
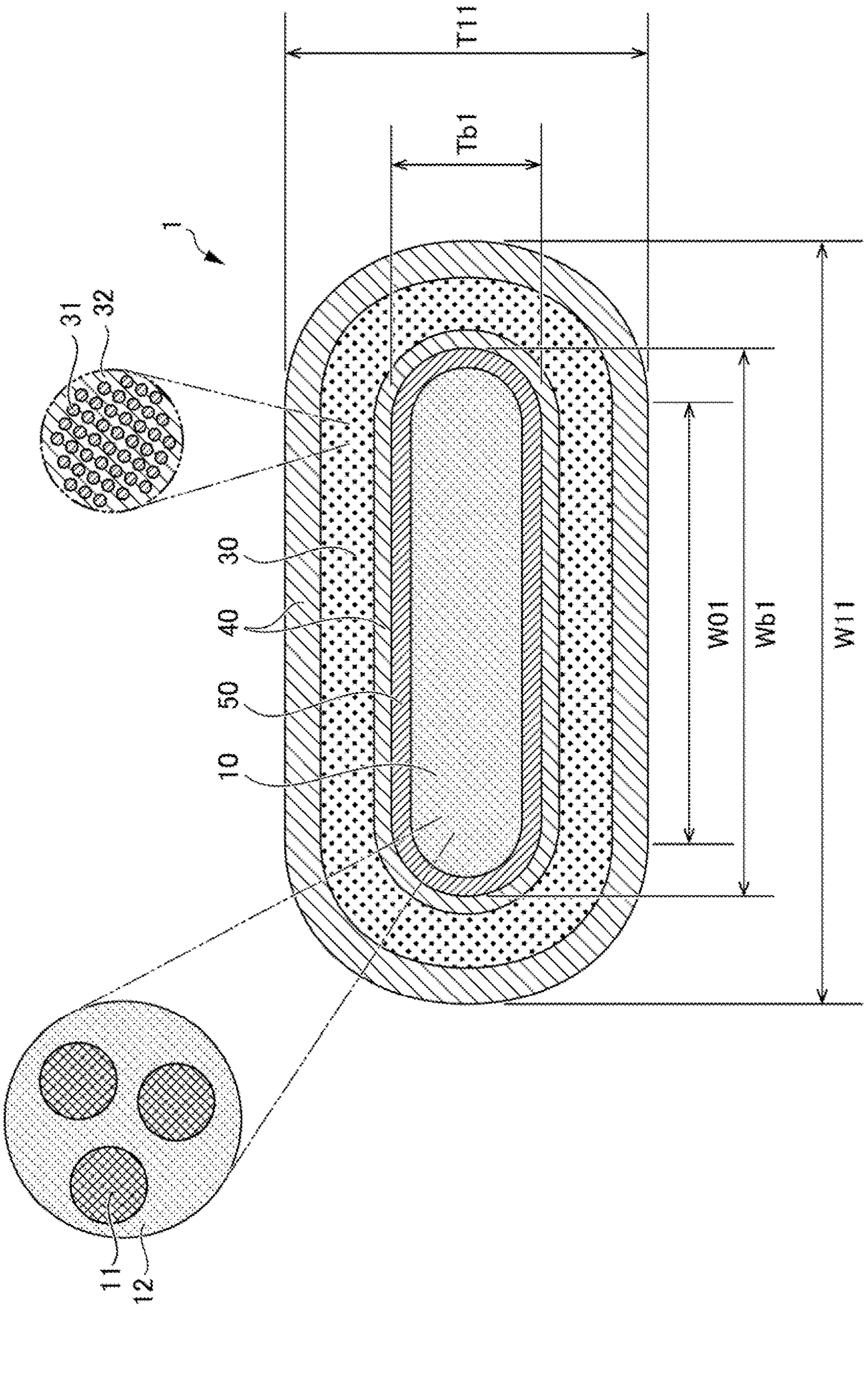
FIG. 1 is a transverse sectional view showing an example of a precursor wire for compound superconducting wire according to an embodiment.

FIG. 1 is a transverse sectional view showing an example of a precursor wire for compound superconducting wire according to an embodiment. As shown in FIG. 1, the precursor wire 1 for compound superconducting wire has a compound superconducting precursor member 10, a reinforcing member 30 and a stabilizing member 40.

The compound superconducting precursor member 10 constituting the precursor wire 1 for compound superconducting wire is configured by a plurality of compound superconducting precursor filaments 11 and a first matrix precursor 12. The compound superconducting precursor member 10 is linear, and extends along the longitudinal direction of the precursor wire 1 for compound superconducting wire. The first matrix precursor 12 embeds a plurality of compound superconducting precursor filaments 11, and includes a first stabilizing material.

The compound superconducting precursor filament 11 becomes a compound superconducting filament 21 containing a compound superconducting phase, by conducting a thermal treatment process for generating the compound superconducting phase described later. It is preferable that the compound superconducting phase constituting the compound superconducting wire 2 described later is a metal compound superconducting phase formed by $Nb_3Sn$, and hence the compound superconducting precursor filament 11 is preferably formed by Nb. The material constituting the compound superconducting precursor filament 11 is selected as appropriate according to the type of the compound superconducting phase.

The first matrix precursor 12 containing the first stabilizing material becomes the first matrix 22 containing the first stabilizing material by conducting thermal treatment process for generating the compound superconducting phase. The first matrix 22 containing the first stabilizing material can exert the effects of suppression of damage to the compound superconducting filament 21, magnetic stabilization and thermal stabilization of the compound superconducting wire 2. If the first stabilizing material constituting the first matrix precursor 12 is copper or a copper alloy, these effects further improve.

In addition, since the compound superconducting phase being a metal compound superconducting phase formed by $Nb_3Sn$ is preferable, the first stabilizing material is preferably formed by a Cu—Sn alloy. The material constituting the first stabilizing material is appropriately selected according to the type of the compound superconducting phase constituting the compound superconducting wire 2.

In the case of the first stabilizing material of the first matrix precursor 12 being a Cu—Sn alloy, it is possible for the first stabilizing material of the first matrix precursor 12 to contain as much as 15.8% by mass of Sn (solid solubility limit). Additionally, the first stabilizing material of the first matrix precursor 12 may contain other elements other than Cu and Sn so long as a small amount, and preferably contains, for example, Ti, etc. in a range of 0.2% by mass or more and 0.3% by mass or less.

FIG. 1 and FIGS. 2 to 4 described later show examples of generating the compound superconducting phase of $Nb_3Sn$ by the bronze method, however, another method such as an internal tin method may be applied to the generation of the compound superconducting phase of $Nb_3Sn$. In addition, herein, an example is shown in which the compound superconducting phase is $Nb_3Sn$, however, the compound superconducting phase may be a compound superconductor having a superconducting property of large strain sensitivity, compared to an alloy-based superconductor such as NbTi.

The reinforcing member 30 constituting the precursor wire 1 for compound superconducting wire is tubular, and is arranged on the outer circumferential side of the compound superconducting precursor member 10. The reinforcing member 30 is configured by a plurality of reinforcing filaments 31 and a second matrix 32. The second matrix 32 embeds the plurality of reinforcing filaments 31, and includes the second stabilizing material.

The reinforcing filaments 31 constituting the reinforcing member 30 preferably consists of one type of metal selected from the group consisting of Nb, Ta, V, W, Mo, Fe, Ti and Hf, or an alloy configured by two or more of these metals. It should be noted that the reinforcing filament 31 may contain unavoidable impurities.

As an example, in the case of the reinforcing filament 31 mainly containing Nb, as unavoidable impurities, for example, O in 150 ppm or less, H in 15 ppm or less, C in 100 ppm or less, N in 100 ppm or less, Fe in 50 ppm or less, Ni in 50 ppm or less, Ti in 20 ppm or less, Si in 50 ppm or less, W in 300 ppm or less, and Ta in 1000 ppm or less may be contained. In addition, in the case of the reinforcing filament 31 mainly containing Ta, as unavoidable impurities, O, H, C, N, Fe, Ni, Ti, Si, W, Nb and Mo may be contained.

Since these metals or alloy constituting the reinforcing filament 31 hardly form a solid solution in Cu upon the thermal treatment process for generating the compound superconducting phase, these metals or alloy hardly form a compound with Cu, and effectively contributes to an improvement in the bending strain characteristics. Among them, the reinforcing filament 31, if considering the impact on the compound superconducting wire 2, preferably consists of one metal selected from the group consisting of Nb, Ta, V, W, Mo and Hf or an alloy constituted by at least two of these metals which do not exhibit ferromagnetism, and further, from the point of processability, preferably consists of one metal selected from the group consisting of Nb, Ta and V or at least two of these metals.

In addition, the alloy constituted by at least two metals selected from the above element group constituting the reinforcing filament 31 is preferably a Nb—Ta alloy from the point of being superior in combined processability with copper or a copper alloy. In addition, the alloy constituted by a metal selected from the above-mentioned element group and copper is preferably a Cu—Nb alloy or Cu—V alloy from the point of being superior in combined processability with copper or a copper alloy.

The above hardly forming a solid solution with Cu refers to the proportion of the metal or alloy, that is solid-soluted into Cu, constituting the reinforcing filament 31 being less than 1 at % in the thermal treatment process for generating the compound superconducting phase (for example, 600° C. to 750° C.).

In the above way, with the reinforcing member 30, a plurality of the reinforcing filaments 31 constituted by the metal material which hardly forms a solid solution with Cu are embedded in the second matrix 32. For this reason, it is possible to suppress an intermetallic compound from being generated in the reinforcing filament 31 in the reinforcing member 30, and thus the reinforcing member 30 can function as a high strength constituent element with strong tensile strain and strong bending strain.

The second stabilizing material constituting the second matrix 32 of the reinforcing member 30 is preferably copper or a copper alloy. It should be noted that the second stabilizing material may contain unavoidable impurities. As the unavoidable impurities of the second stabilizing material, O, Fe, S and Bi can be exemplified. The second matrix 32 containing the second stabilizing material can exert an effect of providing a stabilizing function in addition to the reinforcing function to the reinforcing member 30.

The stabilizing member 40 constituting the precursor wire 1 for compound superconducting wire is tubular, and is arranged to at least either of the inner circumferential side or the outer circumferential side of the reinforcing member 30. The stabilizing member 40 consists of a third stabilizing material. FIG. 1 and FIGS. 2 to 4 described later show examples in which the stabilizing member 40 is arranged at both the inner circumferential side and the outer circumferential side of the reinforcing member 30. The stabilizing member 40 suppresses abnormal deformation in processing of the reinforcing member 30, and can exert an effect of providing a stabilizing function.

The third stabilizing material constituting the stabilizing member 40 is preferably copper or a copper alloy, and is more preferably oxygen-free copper. It should be noted that the third stabilizing material may contain unavoidable impurities. As the unavoidable impurities of the third stabilizing material, O, Fe, S and Bi can be exemplified.

In addition, in the above way, the precursor wire 1 for compound superconducting wire uses the first stabilizing material constituting the compound superconducting precursor member 10, the second stabilizing material constituting the reinforcing member 30, and the third stabilizing material constituting the stabilizing member 40. The stabilizing material referred to herein indicates a normal conduction metal material which is generally a metal material that ensures thermal contact with a coolant, and/or electrically and/or thermally contacts a superconductor so as to act as an electrical shunt circuit, and which is compositing with the superconductor to increase the stability of the superconductor, as defined by JIS H7005:2005. More specifically, the normal conduction metal such as copper or aluminum has low resistivity at very low temperatures, and good heat conduction; therefore, in the case of using as a matrix of the superconducting wire, even if there is transition from a superconducting state to a normal conduction state, the current bypasses and flows to these normal conduction metals. In the compound superconducting wire 2 described later, heat generation is curbed, and the generated heat rapidly propagates and diffuses to be cooled. Furthermore, normal conduction metals such as copper and aluminum which damp external magnetic flux fluctuations and do not convey the magnetic flux fluctuations directly to the superconductor are widely used as a stabilizing material of superconducting wire.

In the case of the compound superconducting precursor filament 11 of the compound superconducting precursor member 10 being $Nb_3Sn$ precursor, i.e. the compound superconducting precursor filament 11 being Nb, the precursor wire 1 for compound superconducting wire preferably further includes an Sn diffusion prevention member 50 consisting of Nb or Ta, or an alloy of these, or a composite material of these, arranged between the compound superconducting precursor member 10 and the reinforcing member 30.

The Sn diffusion prevention member 50 prevents the Sn in the Cu—Sn alloy constituting the first matrix precursor 12 for forming the $Nb_3Sn$ filament into the compound superconductor member 20 during thermal treatment processing for generating the compound superconductor described later from diffusing to the reinforcing member 30 or the stabilizing member 40, and has a function of preventing a decline in residual resistance ratio of the second stabilizing material constituting the reinforcing member 30 and the third stabilizing material constituting the stabilizing member 40, as well as maintaining, in the Cu—Sn alloy, the Sn amount required for generating $Nb_3Sn$ reacting with the Nb filament of the compound superconducting precursor filament 11.

For the compound superconducting precursor member 10 constituting the precursor wire 1 for compound superconducting wire, as shown in FIG. 1, in a cross section perpendicular to the longitudinal direction of the compound superconductor precursor member 10, the aspect ratio Ab1 (Wb1/Tb1) of the width dimension Wb1 of the compound superconducting precursor member 10 relative to the thickness dimension Tb1 of the compound superconducting precursor member 10 is 1.80 or more.

Herein, since the compound superconducting precursor member 10 extends along the longitudinal direction of the precursor wire 1 for compound superconducting wire, the longitudinal direction of the compound superconducting precursor member 10 is the same direction as the longitudinal direction of the precursor wire 1 for compound superconducting wire. In addition, as shown in FIG. 1, in a cross section perpendicular to the longitudinal direction of the compound superconducting precursor member 10, i.e. in the transverse section of the compound superconducting precursor member 10, the thickness dimension Tb1 of the compound superconducting precursor member 10 is smaller than the width dimension Wb1 of the compound superconducting precursor member 10.

In addition, in the transverse section of the compound superconducting precursor member 10, the thickness dimension Tb1 of the compound superconducting precursor member 10 is a maximum thickness dimension of the compound superconducting precursor member 10 in the case of the precursor wire 1 for compound superconducting wire not including the Sn diffusion prevention member 50, and is a maximum thickness dimension of the total region of the compound superconducting precursor member 10 and the Sn diffusion prevention member 50 in the case of the precursor wire 1 for compound superconducting wire including the Sn diffusion prevention member 50.

In addition, in the transverse section of the compound superconducting precursor member 10, the width dimension Wb1 of the compound superconducting precursor member 10 is a maximum width dimension of the compound superconducting precursor member 10 in the case of the precursor wire 1 for compound superconducting wire not including the Sn diffusion prevention member 50, and is a maximum width dimension of the total region of the compound superconducting precursor member 10 and the Sn diffusion prevention member 50 in the case of the precursor wire 1 for compound superconducting wire including the Sn diffusion prevention member 50.

When the above-mentioned aspect ratio Ab1 (Wb/Tb1) is 1.80 or more, the compound superconducting member 20 with high aspect ratio is generated by conducting the thermal treatment process for generating the compound superconducting phase described later, on the precursor wire 1 for compound superconducting wire including the compound superconducting precursor member 10 with high aspect ratio. The compound superconducting wire 2 including the compound superconducting member 20 of increased aspect ratio can have high critical current, compared to a compound superconducting wire including a compound superconducting member having an aspect ratio Ab2 of less than 1.80 with the same transverse sectional area as the transverse sectional area of the compound superconducting member 20. In particular, the compound superconducting wire 2 including the compound superconducting member 20 of increased aspect ratio can have yet higher critical current, compared to the compound superconducting wire including the compound superconducting member having an aspect ratio Ab2 of less than 1.80, because of being able to suppress a decline in energization characteristics due to strain when bending in a small diameter, in the coil winding by the React-and-Wind method. As a result thereof, it is possible to produce a high-performance superconducting coil with small diameter. For such reasons, the above-mentioned aspect ratio Ab1 (Wb1/Tb1) is 1.80 or more, is preferably 2.00 or more, and is even more preferably 3.00 or more.

In addition, the aspect ratio Ab1 (Wb1/Tb1) is preferably 11.00 or less, is more preferably 10.50 or less, is even more preferably 10.00 or less, is particularly preferably 9.00 or less, and is most preferably 8.00 or less. When the aspect ratio Ab1 (Wb1/Tb1) is 11.00 or less, the critical current further improves for the compound superconducting wire 2 obtained by conducting the thermal treatment process for generating the compound superconducting phase on the precursor wire 1 for compound superconducting wire.

In a cross section perpendicular to the longitudinal direction of the precursor wire 1 for compound superconducting wire, the total cross-sectional area of the cross-sectional area of the compound superconducting precursor member 10, the cross-sectional area of the reinforcing member 30 and the cross-sectional area of the stabilizing member 40 is preferably 0.40 $mm^2$ or more and 4.00 $mm^2$ or less. When the above-mentioned total cross-sectional area is within the above range, it will be superior in windability to a small diameter, and possible to improve the critical current. Herein, such cross-sectional area of the compound superconducting precursor member 10 is the cross-sectional area of the compound superconducting precursor member 10 in the case of the precursor wire 1 for compound superconducting wire not including the Sn diffusion prevention member 50, and is the total cross-sectional area of the cross-sectional area of the compound superconducting precursor member 10 and the cross-sectional area of the Sn diffusion prevention member 50 in the case of the precursor wire 1 for compound superconducting wire including the Sn diffusion prevention member 50.

In FIG. 1, T11 is the maximum thickness dimension of the precursor wire 1 for compound superconducting wire. W11 is the maximum width dimension of the precursor wire 1 for compound superconducting wire. W01 is the length of the width-direction flat area on the most outward layer of the precursor wire 1 for compound superconducting wire.

Figure 2:
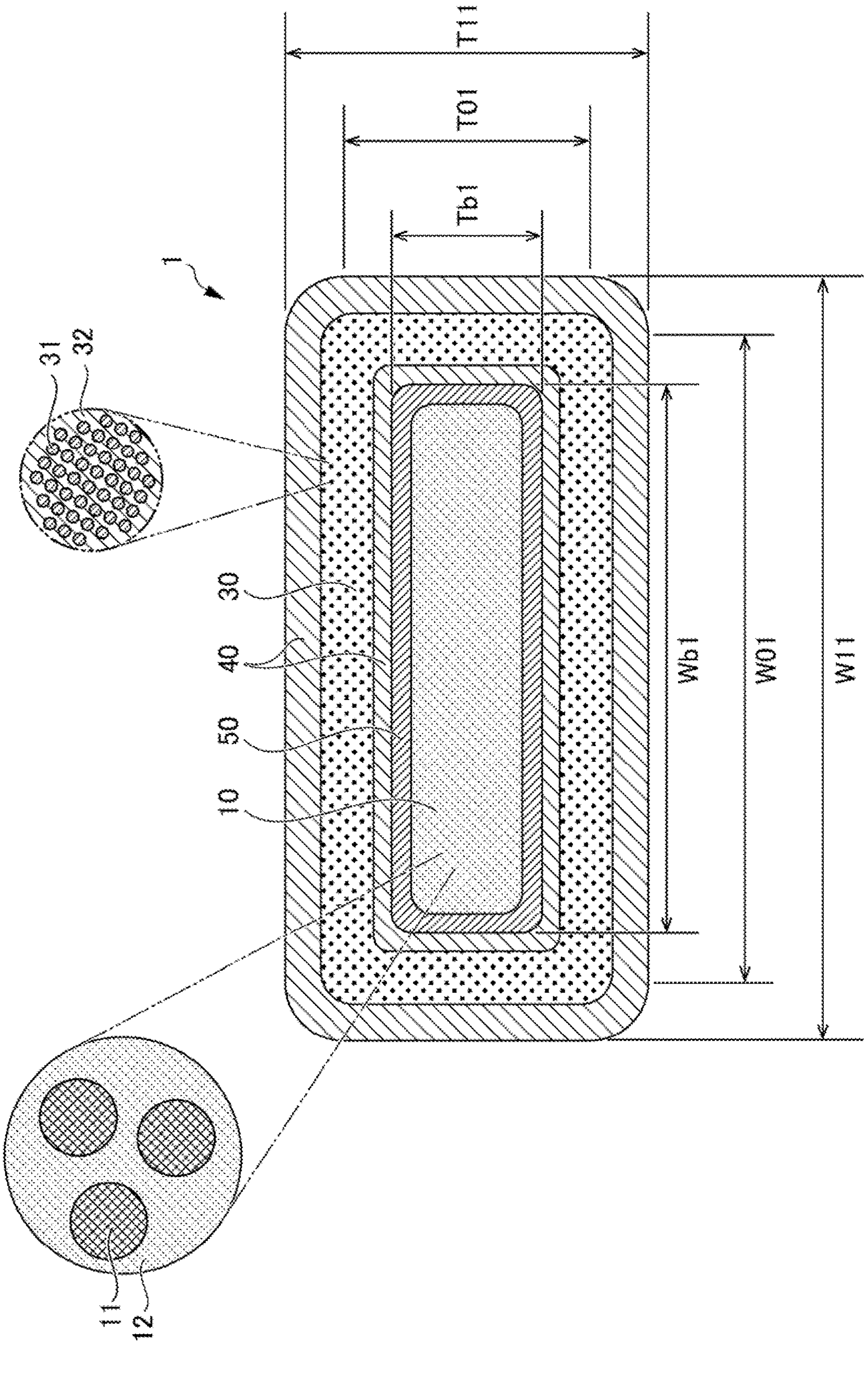
FIG. 2 is a transverse sectional view showing another example of a precursor wire for compound superconducting wire according to an embodiment.

FIG. 2 is a transverse sectional view showing another example of a precursor wire for compound superconducting wire according to an embodiment. T01 is the length of the thickness-direction flat area on the most outward layer of the precursor wire 1 for compound superconducting wire. The precursor wire 1 for compound superconducting wire shown in FIG. 2 is basically the same configuration as the precursor wire 1 for compound superconducting wire shown in FIG. 1 except for having T01. For example, in the precursor wire 1 for compound superconducting wire shown in FIG. 1, the transverse sectional shapes of the precursor wire 1 for compound superconducting wire and the compound superconducting precursor member 10 respectively have a pair of sides extending in the width direction facing each other which are linear (substantially parallel), and a pair of sides extending in the thickness direction facing each other which are arcs. In addition, in the precursor wire 1 for compound superconducting wire shown in FIG. 2, the transverse sectional shapes of the precursor wire 1 for compound superconducting wire and the compound superconducting precursor member 10 respectively have a pair of sides extending in the width direction facing each other which are linear (substantially parallel), a pair of sides extending in the thickness direction facing each other which are linear (substantially parallel), and all the corner portion which are arcs.

Figure 3:
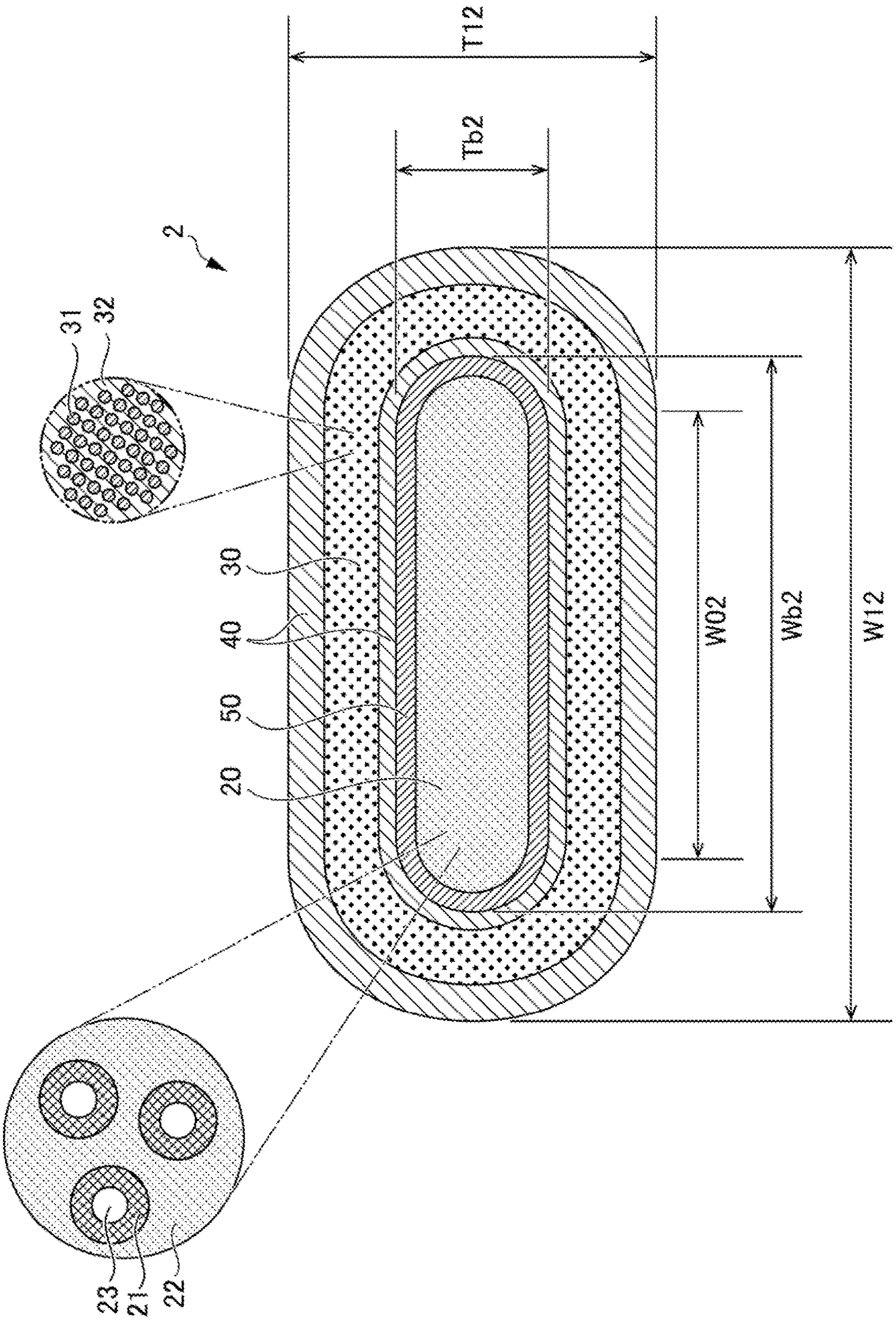
FIG. 3 is a transverse sectional view showing an example of a compound superconducting wire according to an embodiment.

Next, a compound superconducting wire according to the embodiment will be explained. FIG. 3 is a transverse sectional view showing an example of a compound superconducting wire according to the embodiment. As shown in FIG. 3, the compound superconducting wire 2 includes the compound superconductor member 20, the reinforcing member 30, and the stabilizing member 40. The compound superconducting wire 2 can be obtained by conducting the thermal treatment process described later on the precursor wire 1 for compound superconducting wire. More specifically, by thermally treating the precursor wire 1 for compound superconducting wire shown in FIG. 1, it is possible to obtain the compound superconducting wire 2 shown in FIG. 3.

The compound superconducting member 20 constituting the compound superconducting wire 2 is configured by a plurality of compound superconducting filaments 21 containing the compound superconducting phase, and the first matrix 22. The compound superconducting member 20 is linear, and extends along the longitudinal direction of the compound superconducting wire 2. The first matrix 22 embeds the plurality of compound superconducting filaments 21, and includes the first stabilizing material.

The compound superconducting phase is preferably a metal compound superconducting phase formed by $Nb_3Sn$. The compound superconducting phase is not limited to $Nb_3Sn$ and, for example, may be formed by $Nb_3Al$ or another metal compound superconducting phase having a superconducting property.

The first matrix 22 containing the first stabilizing material can exert the effects of suppression of damage to the compound superconducting filament 21, magnetic stabilization and thermal stabilization of the compound superconducting wire 2. If the first stabilizing material constituting the first matrix 22 is copper or a copper alloy, these effects further improve.

Since the compound superconducting phase is preferably a metal compound superconducting phase formed by $Nb_3Sn$, the first stabilizing material is preferably formed by a Cu—Sn alloy. In addition, the material constituting the first stabilizing material is appropriately selected according to the type of the compound superconducting phase.

In the case of the first stabilizing material of the first matrix 22 being a Cu—Sn alloy, the Sn content ratio in the first matrix 22 is smaller than the Sn content ratio in the first matrix precursor 12 constituting the precursor wire 1 for compound superconducting wire. As a result of Sn in the Cu—Sn alloy being used in the generation of the $Nb_3Sn$ filament serving as the compound superconducting filament 21, even the Sn content ratio in the first matrix 22 is small on the order of 1.0% by mass or more and 2.0% by mass or less, the first matrix 22 will not have a function as a stabilizing material equivalent to Cu.

FIG. 3 shows the compound superconducting member 20 produced by the bronze method. With the bronze method, when conducting thermal treatment processing for generating the compound superconducting phase on the precursor wire 1 for compound superconducting wire in a state in which a plurality of Nb filaments as the compound superconducting precursor filaments 11 are embedded in the first matrix precursor 12 of Cu—Sn alloy as the first stabilizing material, by Sn in the first matrix precursor 12 diffusing and reacting with the surface of the Nb filaments, it is possible to generate the $Nb_3Sn$ filaments as the compound superconducting filaments 21 from the Nb filament.

In addition, the enlarged view of the compound superconducting member 20 shown in FIG. 3 and FIG. 4 described later shows an example in which a core portion 23 of unreacted Nb remaining without reacting with Sn exists. However, according to the amount of Sn contained in the first matrix precursor 12 of the precursor wire 1 for compound superconducting wire, and the diameter size of the compound superconducting precursor filament 11 of the precursor wire 1 for compound superconducting wire, etc., the compound superconducting filament 21 may consist of $Nb_3Sn$ without the core portion 23 as unreacted portion being present in the compound superconducting filament 21 of the compound superconducting member 20.

The reinforcing member 30 constituting the compound superconducting wire 2 is tubular, and is arranged at the outer circumferential side of the compound superconducting member 20. The reinforcing member 30 is configured by a plurality of reinforcing filaments 31 and the second matrix 32. The second matrix 32 embeds the plurality of reinforcing filament 31, and includes the second stabilizing material.

The reinforcing member 30 constituting the compound superconducting wire 2 has basically the same configuration and the function as the reinforcing member 30 constituting the precursor wire 1 for compound superconducting wire. Similarly to the precursor wire 1 for compound superconducting wire, the reinforcing filament 31 preferably consists of one type of metal selected from the group consisting of Nb, Ta, V, W, Mo, Fe, Ti and Hf, or an alloy constituted by two or more of these metals. In addition, similarly, the second stabilizing material constituting the second matrix 32 is preferably copper or a copper alloy.

The stabilizing member 40 constituting the compound superconducting wire 2 is tubular, and is arranged to at least either of the inner circumferential side or the outer circumferential side of the reinforcing member 30. The stabilizing member 40 consists of a third stabilizing material. FIG. 3 shows an example in which the stabilizing member 40 is arranged at both the inner circumferential side and the outer circumferential side of the reinforcing member 30. The stabilizing member 40 suppresses abnormal deformation during processing of the reinforcing member 30, and can exert an effect of providing a stabilizing function.

The stabilizing member 40 constituting the compound superconducting wire 2 has basically the same configuration and the function as the stabilizing member 40 constituting the precursor wire 1 for compound superconducting wire. Similar to the precursor wire 1 for compound superconducting wire, the third stabilizing material constituting the stabilizing member 40 is preferably copper or a copper alloy, and is more preferably oxygen-free copper.

In addition, in the above way, the compound superconducting wire 2 uses the first stabilizing material constituting the compound superconducting member 20, the second stabilizing material constituting the reinforcing member 30, and the third stabilizing material constituting the stabilizing member 40. The stabilizing material indicates a normal conduction metal material which is generally a metal material that ensures thermal contact with a coolant, and/or electrically and/or thermally contacts a superconductor so as to act as an electrical shunt circuit, and which is compositing with the superconductor to increase the stability of the superconductor, as defined by JIS H7005:2005. More specifically, the normal conduction metal such as copper or aluminum has low resistivity at very low temperatures, and good heat conduction; therefore, in the case of using as a matrix of the superconducting wire, even if there is transition from a superconducting state to a normal conduction state, the current bypasses and flows to these normal conduction metals. In the compound superconducting wire 2, heat generation is curbed, and the generated heat rapidly propagates and diffuses to be cooled. Furthermore, normal conduction metals such as copper and aluminum which damp external magnetic flux fluctuations and do not convey the magnetic flux fluctuations directly to the superconductor are widely used as a stabilizing material of superconducting wire.

In the case of the compound superconducting phase of the compound superconducting member 20 being $Nb_3Sn$, the compound superconducting wire 2 preferably further includes an Sn diffusion prevention member 50 consisting of Nb or Ta, or an alloy of these, or a composite material of these, arranged between the compound superconducting member 20 and the reinforcing member 30. The Sn diffusion prevention member 50 constituting the compound superconducting wire 2 basically has the same configuration and the function as the Sn diffusion prevention member 50 constituting the precursor wire 1 for compound superconducting wire.

Figure 4:
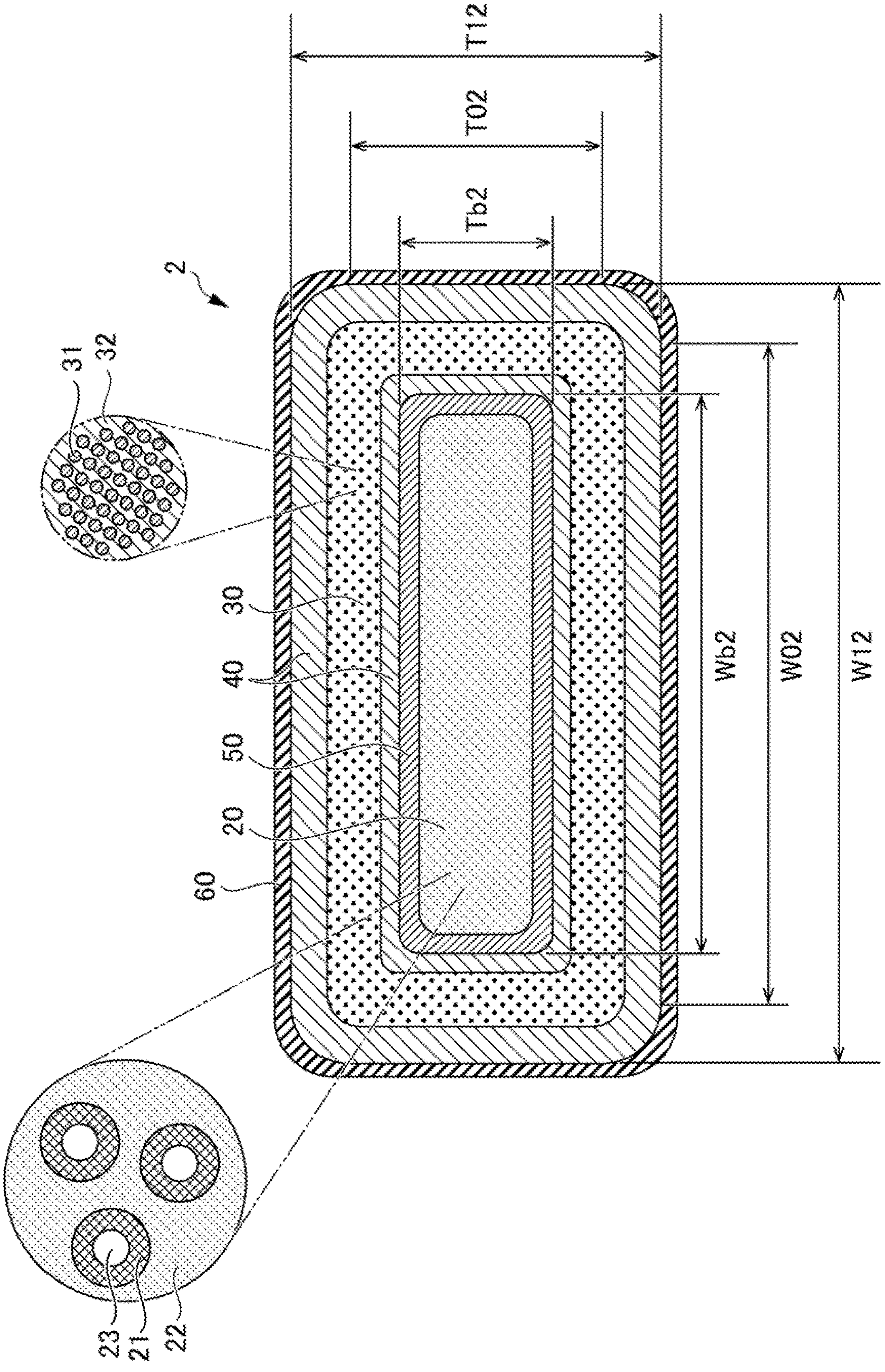
FIG. 4 is a transverse sectional view showing another example of a compound superconducting wire according to an embodiment.

FIG. 4 is a transverse sectional view showing another example of the compound superconducting wire according to an embodiment. As shown in FIG. 4, the compound superconducting wire 2 may further include an electrical insulation member 60 containing a resin arranged at the outermost circumference. The compound superconducting wire 2 shown in FIG. 4 is basically the same configuration as the compound superconducting wire 2 shown in FIG. 3 except for having the electrical insulation member 60 and T02 described later. For example, in the compound superconducting wire 2 shown in FIG. 3, the transverse sectional shapes of the compound superconducting wire 2 and the compound superconducting member 20 respectively have a pair of sides extending in the width direction facing each other which are linear (substantially parallel), and a pair of sides extending in the thickness direction facing each other which are arcs. In addition, in the compound superconducting wire 2 shown in FIG. 4, the transverse sectional shapes of the compound superconducting wire 2 and the compound superconducting member 20 respectively have a pair of sides extending in the width direction facing each other which are linear (substantially parallel), a pair of sides extending in the thickness direction facing each other which are linear (substantially parallel), and all the corner portion which are arcs.

The production method of the compound superconducting wire 2 by the React-and-Wind method performs an insulation coating process of forming the electrical insulation member 60, after the thermal treatment process for generating the compound superconducting phase as described later. For this reason, the electrical insulation member 60 of the compound superconducting wire 2 produced by the React-and-Wind method is configured from an insulating material such as a resin with low melting point, in addition to the insulating material such as glass with high melting point.

On the other hand, the production method of the compound superconducting wire 2 by the Wind-and-React method performs the thermal treatment process for generating the compound superconducting phase, after the insulation coating process of forming the electrical insulation member 60 as described later. The electrical insulation member 60 must have an electrical insulation property even after subjected to the thermal treatment process. A low melting point material such as a resin is thermally decomposed in the thermal treatment process. For this reason, the electrical insulation member 60 of the compound superconducting wire 2 produced by the Wind-and-React method is configured from an insulating material such as glass with high melting point.

In the point of being superior in windability to a small diameter and the electrical insulation property, and improving the critical current, the resin constituting the electrical insulation member 60 is preferably an enamel resin such as polyvinyl formal resin, polyamideimide resin, polyimide resin, or an epoxy resin.

For the compound superconducting member 20 constituting the compound superconducting wire 2, as shown in FIGS. 3 and 4, in a cross section perpendicular to the longitudinal direction of the compound superconducting member 20, the aspect ratio Ab2 (Wb2/Td2) of the width dimension Wb2 of the compound superconducting member 20 relative to the thickness dimension Tb2 of the compound superconducting member 20 is 1.80 or more.

Herein, since the compound superconducting member 20 extends along the longitudinal direction of the compound superconducting wire 2, the longitudinal direction of the compound superconducting member 20 is the same direction as the longitudinal direction of the compound superconducting wire 2. In addition, as shown in FIGS. 3 and 4, in the cross section perpendicular to the longitudinal direction of the compound superconducting member 20, i.e. in the transverse section of the compound superconducting member 20, the thickness dimension Tb2 of the compound superconducting member 20 is smaller than the width dimension Wb2 of the compound superconducting member 20.

In addition, in the transverse section of the compound superconducting member 20, the thickness dimension Tb2 of the compound superconducting member 20 is a maximum thickness dimension of the compound superconducting member 20 in the case of the compound superconducting wire 2 not including the Sn diffusion prevention member 50, and is a maximum thickness dimension of the total region of the compound superconducting member 20 and the Sn diffusion prevention member 50 in the case of the compound superconducting wire 2 including the Sn diffusion prevention member 50.

In addition, in the transverse section of the compound superconducting member 20, the width dimension Wb2 of the compound superconducting member 20 is a maximum width dimension of the compound superconducting member 20 in the case of the compound superconducting wire 2 not including the Sn diffusion prevention member 50, and is a maximum width dimension of the total region of the compound superconducting member 20 and the Sn diffusion prevention member 50 in the case of the compound superconducting wire 2 including the Sn diffusion prevention member 50.

When the above-mentioned aspect ratio Ab2 (Wb2/Tb2) is 1.80 or more, the compound superconducting member 20 is higher aspect ratio. The compound superconducting wire 2 including the compound superconducting member 20 of increased aspect ratio can have high critical current, compared to a compound superconducting wire including a compound superconducting member having an aspect ratio Ab2 of less than 1.80 with the same transverse sectional area as the transverse sectional area of the compound superconducting member 20. In particular, the compound superconducting wire 2 having an aspect ratio Ab2 of 1.80 or more can have yet higher critical current, because of being able to suppress a decline in energization characteristics due to strain when bending in a small diameter, in the coil winding by the React-and-Wind method. As a result thereof, it is possible to produce a high-performance superconducting coil with small diameter. For such reasons, the above-mentioned aspect ratio Ab2 (Wb2/Tb2) is 1.80 or more, is preferably 2.00 or more, and is even more preferably 3.00 or more.

In addition, the aspect ratio Ab2 (Wb2/Tb2) is preferably 11.00 or less, is more preferably 10.50 or less, is even more preferably 10.00 or less, is particularly preferably 9.00 or less, and is most preferably 8.00 or less. When the aspect ratio Ab2 (Wb2/Tb2) is 11.00 or less, the critical current further improves for the compound superconducting wire 2.

In a cross section perpendicular to the longitudinal direction of the compound superconducting wire 2, the total cross-sectional area of the cross-sectional area of the compound superconducting member 20, the cross-sectional area of the reinforcing member 30 and the cross-sectional area of the stabilizing member 40 is preferably 0.40 $mm^2$ or more and 4.00 $mm^2$ or less. When the above-mentioned total cross-sectional area is within the above range, it will be superior in windability to a small diameter, and possible to improve the critical current. Herein, such cross-sectional area of the compound superconducting member 20 is the cross-sectional area of the compound superconducting member 20 in the case of the compound superconducting wire 2 not including the Sn diffusion prevention member 50, and is the total cross-sectional area of the cross-sectional area of the compound superconducting member 20 and the cross-sectional area of the Sn diffusion prevention member 50 in the case of the compound superconducting wire 2 including the Sn diffusion prevention member 50.

In FIGS. 3 to 4, T12 is the maximum thickness dimension of a portion excluding the electrical insulation member 60 from the compound superconducting wire 2. W12 is the maximum width dimension of a portion excluding the electrical insulation member 60 from the compound superconducting wire 2. T02 is the length of the thickness-direction flat area on the most outward layer excluding the electrical insulation member 60 from the compound superconducting wire 2. W02 is the length of the width-direction flat area on the most outward layer excluding the electrical insulation member 60 from the compound superconducting wire 2.

Figure 5:
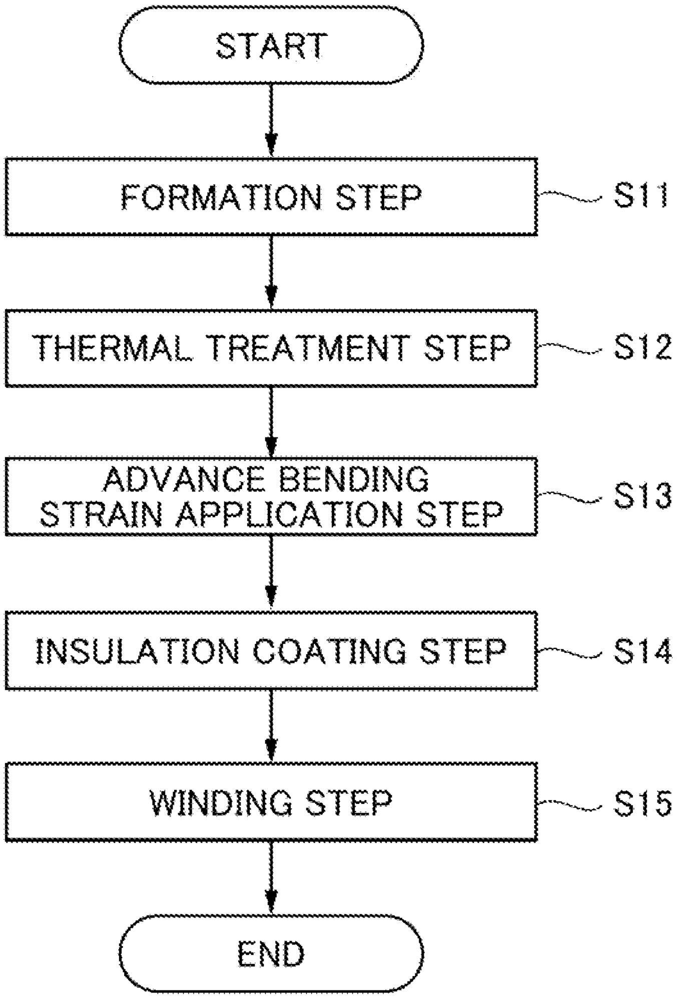
FIG. 5 is a process flow for explaining a production method of a superconducting coil by a React-and-Wind method using a precursor wire for compound superconducting wire and a compound superconducting wire according to an embodiment.

FIG. 5 is the process flow for explaining the production method of a superconducting coil by the React-and-Wind method using the precursor wire 1 for compound superconducting wire and the compound superconducting wire 2 according to the embodiment. The production method of the superconducting coil by the React-and-Wind method mainly includes a formation step S11 of the precursor wire 1 for compound superconducting wire, a thermal treatment step S12, an advance bending strain application step S13, an insulation coating step S14 and a winding step S15. Herein, an example in which the compound superconducting phase is $Nb_3Sn$ and the production method is the bronze method will be explained.

The formation step S11 forms the precursor wire 1 for compound superconducting wire. The formation step S11 forms the precursor wire 1 for compound superconducting wire, by performing a wire drawing process, after performing extrusion on the billet formed by sequentially arranging the compound superconducting precursor member configured by a plurality of Nb filaments which are compound superconducting precursor filaments, and a first matrix precursor consisting of Cu—Sn alloy embedding the plurality of Nb filaments; and on the outer circumferential side of the compound superconducting precursor member, the Sn diffusion prevention member; the reinforcing member; and the stabilizing member.

As the formation step S11, in the case of the compound superconducting phase being $Nb_3Sn$, for example, it is possible to adopt a known method for forming a $Nb_3Sn$ wire material such as the internal tin diffusion method or powder-in-tube method, in addition to the above-mentioned bronze method.

The thermal treatment step S12 heats the precursor wire 1 for compound superconducting wire obtained in the formation step S11 to generate the compound superconducting phase and form the compound superconducting wire 2.

The advance bending strain application step S13 applies a predetermined bending strain by conducting a bending process on the compound superconducting wire 2 obtained in the thermal treatment step S12. The advance bending strain application step S13 of repeatedly applying bending strain to the compound superconducting wire 2 retains the directivity of bending of the compound superconducting wire 2, by controlling the bending direction, bend radius and tensile stress. As a result thereof, the residual strain distribution within the cross section is continuously retained over the longitudinal direction of the compound superconducting wire 2. For this reason, the strength of the stabilizing material located near the neutral line of bending becomes smaller than the strength of the stabilizing material located at the outer side or the inner side of the bending direction subject to bending strain. In the case of this difference being significant, it is possible to detect this difference by a micro Vickers hardness test. By regulating the holding direction of the directivity of bending of the compound superconducting wire 2 to the same as the direction in which springing back to the bending direction side during thermal treatment, i.e. side of the direction winding in a circular arc on the thermal treatment bobbin (direction trying to return back to), it can prevent the compound superconducting filament from breaking due to the reverse bending strain exceeding the allowed limit being applied not only in the advance bending strain application step S13 but also in subsequent steps. The allowed limit strain at which the compound superconducting filament will break differs according to the material of the superconductor, cross-sectional configuration of the compound superconducting wire, thermal treatment conditions, advance bending strain application conditions, etc.

It should be noted that, in the case of the critical current of the compound superconducting wire 2 being able to increase compared to prior to coating the electrical insulation member by only the bending strain applied during formation of the electrical insulation member performed in the insulation coating step S14, the advance bending strain application step S13 can be omitted.

The insulation coating step S14 forms the electrical insulation member at the outermost circumference of the compound superconducting wire 2, and coats the outermost circumference of the compound superconducting wire 2 with the electrical insulation member. In the insulation coating step S14, the maximum temperature of the compound superconducting wire 2 during formation of the electrical insulation member is preferably less than 500° C. In addition, the maximum value for the bending strain applied to the compound superconducting wire 2 is preferably less than the bending strain applied in the advance bending strain application step S13. In addition, the tensile strain is preferably 0.2% or less. When implementing the insulation coating step S14 at such conditions, the critical current of the compound superconducting wire 2 including the electrical insulation member may increase compared to the compound superconducting wire 2 before providing the electrical insulation member.

The winding step S15 forms the superconducting coil, by winding onto a coil winding frame (winding member), while restricting the bending strain applied to the compound superconducting wire 2.

The maximum strain received by the compound superconducting filament constituting the compound superconducting wire 2 can be discussed by adding up the tensile strain according to the axial direction tension and the maximum tensile bending strain according to the bending radius applied during winding. In other words, the maximum strain received by the compound superconducting filament must be configured so as not to exceed the strain at which filament damage occurs. In particular, it is necessary to control the maximum strain applied when bending in the reverse direction against the bending direction during thermal treatment. In addition, considering the superconducting property under the maximum pure bending strain received by the compound superconducting filament, the operating current of the superconducting magnet is decided.

Figure 6:
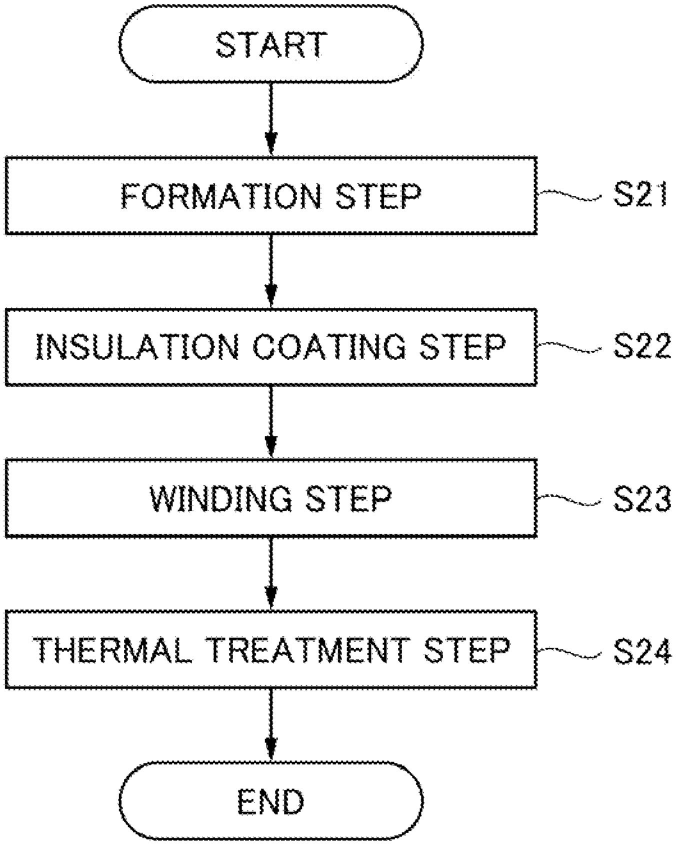
FIG. 6 is a process flow for explaining a production method of a superconducting coil by the Wind-and-React method using a precursor wire for compound superconducting wire and a compound superconducting wire according to an embodiment.

FIG. 6 is the process flow for explaining the production method of superconducting coil by the Wind-and-React method using the precursor wire 1 for compound superconducting wire and the compound superconducting wire 2 according to the embodiment. The production method of the superconducting coil by the Wind-and-React method mainly includes a formation step S21 of the precursor wire 1 for compound superconducting wire, the insulation coating step S22, the winding step S23 and the thermal treatment step S24. Herein, an example in which the compound superconducting phase is $Nb_3Sn$ and the production method is the bronze method will be explained.

In the formation step S21, the precursor wire 1 for compound superconducting wire is formed. The formation step S21 is basically the same as the above-mentioned formation step S11.

The insulation coating step S22 forms the electrical insulation member 60 on the outermost circumference of the precursor wire 1 for compound superconducting wire, and coats the outermost circumference of the precursor wire 1 for compound superconducting wire with the electrical insulation member. In the insulation coating step S22, it is preferable for the maximum temperature of the precursor wire 1 for compound superconducting wire during formation of the electrical insulation member to be less than 500° C.

The winding step S23 winds onto a coil winding frame while limiting the bending strain applied to the precursor wire 1 for compound superconducting wire.

The thermal treatment step S24 heats the precursor wire 1 for compound superconducting wire wound on the coil winding frame to generate a compound superconducting phase and forms the compound superconducting wire 2. It is thereby possible to produce a superconducting coil. It should be noted that, when the electrical insulation member coated on the precursor wire 1 for compound superconducting wire is a low melting point material such as a resin in the insulation coating step S22, since the electrical insulation member is thermally decomposed in the thermal treatment step S24, the electrical insulation member often uses an electrical insulating material such as a glass with high melting point.

Figure 7:
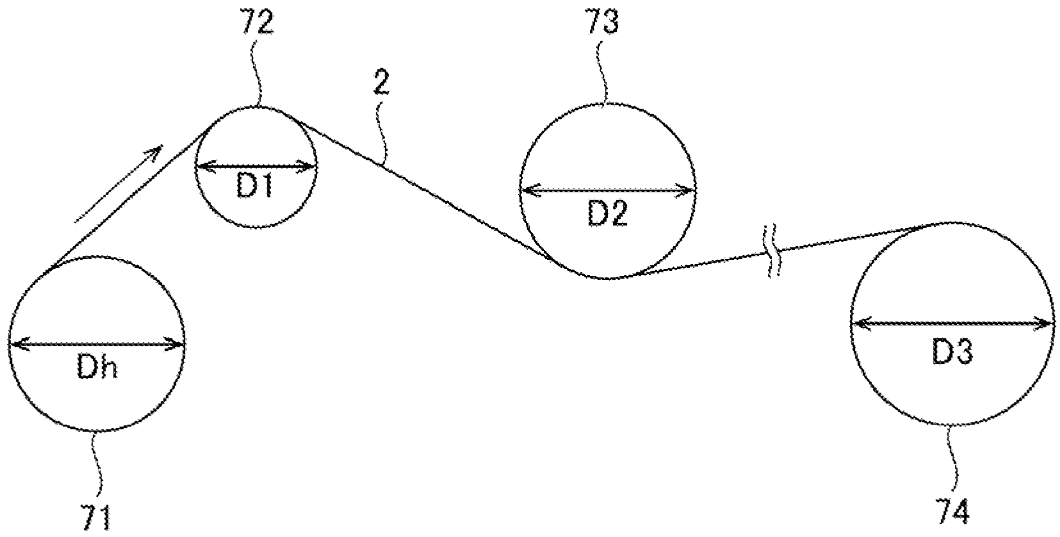
FIG. 7 is a schematic view for explaining a rewinding method of a compound superconducting wire according to an embodiment.

FIG. 7 is a schematic diagram for explaining a rewinding method of a compound superconducting wire according to an embodiment. When rewinding the compound superconducting wire 2 from the first winding member 71 to the second winding member 74, the compound superconducting wire 2 is extended from the first winding member 71 in a tangential direction of the first winding member 71, and the compound superconducting wire 2 is wound onto the second winding member 74 while bending in a bending direction which is the same as when being wound onto the first winding member 71. For example, as shown in FIG. 7, the compound superconducting wire 2 is rewound onto a second winding member 74 with diameter D3, for example, the coil winding frame for forming the superconducting coil, through the forward bending pulley 72 with diameter D1 and the reverse bending pulley 73 with diameter D2 from the first winding member 71 with diameter Dh, for example, the thermal treatment bobbin. For the advance bending strain application conditions, although an example of combining one forward bending pulley 72 and one reverse bending pulley 73 is shown, the arranged number of forward bending pulleys 72 and reverse bending pulleys 73 is not particularly limited, and may be set to combine a plurality of the forward bending pulleys 72 and/or the reverse bending pulleys 73. At this time, the compound superconducting wire 2 is unwound from the first winding member 71 in a tangential direction of the first winding member 71, and the compound superconducting wire 2 is wound onto the second winding member 74 while bending in the same bending direction as when winding onto the first winding member 71. This rewinding method is favorable as a method of rewinding the compound superconducting wire obtained by the React-and-Wire method.

In this way, the compound superconducting wire 2 obtained by thermally treating the precursor wire 1 for compound superconducting wire has superior superconducting property of large critical current, even when bending in a small radius, compared to a conventional compound superconducting wire. In particular, in the superconducting coil production including the thermal treatment step, the advance bending strain application step and the insulation coating step by the React-and-Wind method, since the internal strain of the compound superconducting member is controlled, when controlling the winding direction to the coil winding frame (thermal treatment bobbin), etc., it is possible to further suppress damage to the compound superconducting wire 2 during production, and possible to obtain more superior energization characteristics during operation of the produced superconducting magnet. In addition, by setting the component ratios of constituent members such as the compound superconducting member 20, the reinforcing member 30 and the stabilizing member 40 constituting the compound superconducting wire 2 according to the application of the superconducting coil, it is possible to achieve more practical superconducting coil production. As a result thereof, since it is possible to realize a superconducting magnet designed with a more appropriate operating safety factor, it is possible to reduce the total cost of superconducting coil production including the precursor wire 1 for compound superconducting wire or the compound superconducting wire 2 more than conventional.

According to the above explained embodiment, by the compound superconducting precursor member of the precursor wire for compound superconducting wire and the compound superconducting member of the compound superconducting wire having a predetermined structure, it is possible to rationalize the design and production of a superconducting coil superior in windability to a small diameter and greater critical current property than conventional.

Although embodiments have been explained above, the present invention is not to be limited to the above embodiments, and encompasses every mode included in the scope of gist and claims of the present disclosure, and can be modified in various ways within the scope of the present disclosure.

EXAMPLES

Next, examples and comparative examples will be explained; however, the preset disclosure is not to be limited to these examples.

Examples 1A to 4A, Examples 1B to 4B, Comparative Examples 1a to 4a, Comparative Examples 1b to 4b A compound superconducting wire was produced in which the compound superconducting member is $Nb_3Sn$ formed by the bronze method, including a Sn diffusion prevention member consisting of Nb, the reinforcing member is a Cu—Nb composite, including the stabilizing member of oxygen-free copper on the outer circumferential side of the reinforcing member, and not including an electrical insulation member. This will be explained in detail below.

First, production of the precursor wire for compound superconducting wire will be discussed. A composite element wire of Nb rods and a CuSn alloy was obtained by conducting extrusion process and wire drawing process on a billet embedding a plurality of Nb rods in a CuSn alloy to which Ti was added. Next, a billet for the precursor wire for compound superconducting wire was obtained by configuring an aggregate arranging a plurality of these composite element wires at the central part of an oxygen-free copper tube, then arranging tubular Nb on the outer circumference of this aggregate as an Sn diffusion prevention member, and arranging a plurality of element wires for Cu—Nb reinforcing member obtained by conducting extrusion and drawing on a billet embedding a plurality of Nb rods in an oxygen-free copper serving as a stabilizing member on the outer circumference of the tubular Nb.

Next, the precursor wire for compound superconducting wire including the compound superconducting precursor member having the aspect ratio Ab1 shown in Table 1 was produced, by conducting extrusion and drawing on the billet for the precursor wire for compound superconducting wire to establish the transverse section as roughly circular shape, followed by conducting rolling and wire drawing as necessary.

In Examples 1A to 4A and Comparative Examples 1a to 4a, the compound superconducting wires were produced by the React-and-Wind method. More specifically, the compound superconducting wire including the compound superconducting member having the aspect ratio Ab2 shown in Table 1 was obtained by conducting thermal treatment for 96 hours at 670° C. in order to generate the compound superconducting phase on the precursor wire for compound superconducting wire, then conducting the advance bending strain application step and the winding step so that the pure bending strain after wire winding on the thermal treatment bobbin shown in Table 1 becomes the value of Table 1. The direction of the advance bending strain application step and the winding step were established as a flatwise direction, for the compound superconducting wire having the aspect ratio Ab2 of exceeding 1.

In Examples 1B to 4B and Comparative Examples 1b to 4b, the compound superconducting wires were produced by the Wind-and-React method. More specifically, by conducting thermal treatment for 96 hours at 670° C. in order to generate the compound superconducting phase after wire winding onto the thermal treatment bobbin having the diameter shown in Table 1, the compound superconducting wire including the compound superconducting member having the aspect ratio Ab2 shown in Table 1 was obtained. The direction of the winding step was established as a flatwise direction, for the precursor wire for compound superconducting wire having the aspect ratio Ab2 of exceeding 1.

The critical current of the obtained compound superconducting wire was measured under a DC magnetic field of 14.5 T at 4.2 K. In addition, the critical current density of the compound superconducting member of the compound superconducting wire assumes a value relative to the transverse sectional area of the compound superconducting member (including Sn diffusion prevention member). The applied magnetic field on the compound superconducting member having the aspect ratio Ab2 of exceeding 1 assumes a direction parallel to the width direction of the compound superconducting member. On the other hand, the advance bending strain ε_pre-bent is calculated by the forward advance bending strain $\varepsilon\_pre\text{-}bent^{+}=Tb2\times(+1/D1-1/Dh)$ and the reverse advance bending strain $\varepsilon\_pre\text{-}bent^{-}=Tb2\times(-1/D2-1/Dh)$. Herein, Dh is the diameter of the thermal treatment bobbin, D1 is the diameter of the forward bending pulley, and D2 is the diameter of the reverse bending pulley. For the sizes and frequency of this forward advance bending strain $\varepsilon\_pre\text{-}bent^{+}$ and reverse advance bending strain $\varepsilon\_pre\text{-}bent^{-}$, even in the case of applying advance bending strain in both directions, or in the case of applying advance bending strain in only one direction, it is desired to the advance bending strain being 0.10% or more and 0.60% or less, and to apply at least one time in both ways or one way among forward and reverse directions.

In addition, the bending direction in the React-and-Wind method is established as the same direction (forward) as the bending direction during thermal treatment, and the pure bending strain & pure was calculated by $\varepsilon\_pure=Tb2\times(+1/D3-1/Dh)$. Herein, Dh is the thermal treatment bobbin diameter, and D3 is the bobbin diameter during critical current measurement.

TABLE 1

| Item | Symbol | unit | Example 1A | 2A | 3A | 4A | 1B | 2B | 3B | 4B | Comparative Example 1a | 2a | 3a | 4a | 1b | 2b | 3b | 4b |
|---|---|---|---|---|---|---|---|---|---|---|---|---|---|---|---|---|---|---|
| Maximum width dimension of precursor wire for compound superconducting wire | W11 | mm | 1.52 | 2.00 | 2.30 | 2.60 | 1.52 | 2.00 | 2.30 | 2.60 | 0.45 | 1.00 | 1.38 | 1.30 | 0.45 | 1.00 | 1.38 | 1.30 |
| Maximum thickness dimension of precursor wire for compound superconducting wire | T11 | mm | 0.76 | 0.48 | 0.35 | 0.25 | 0.76 | 0.48 | 0.35 | 0.25 | 0.45 | 1.00 | 0.90 | 1.30 | 0.45 | 1.00 | 0.90 | 1.30 |
| Volume fraction of compound superconducting precursor member | V01 | % | 40 | 40 | 40 | 40 | 40 | 40 | 40 | 40 | 45 | 40 | 40 | 40 | 45 | 40 | 40 | 40 |
| Volume fraction of reinforcing member | V11 | % | 40 | 40 | 40 | 40 | 40 | 40 | 40 | 40 | 35 | 40 | 40 | 40 | 35 | 40 | 40 | 40 |
| Volume fraction of stabilizing member | V21 | % | 20 | 20 | 20 | 20 | 20 | 20 | 20 | 20 | 20 | 20 | 20 | 20 | 20 | 20 | 20 | 20 |
| Width dimension of compound superconducting precursor member | Wb1 | mm | 0.96 | 1.26 | 1.45 | 1.64 | 0.96 | 1.26 | 1.45 | 1.64 | 0.30 | 0.63 | 0.87 | 0.82 | 0.30 | 0.63 | 0.87 | 0.82 |
| Thickness dimension of compound superconducting precursor member | Tb1 | mm | 0.48 | 0.30 | 0.22 | 0.16 | 0.48 | 0.30 | 0.22 | 0.16 | 0.30 | 0.63 | 0.57 | 0.82 | 0.30 | 0.63 | 0.57 | 0.82 |
| Aspect ratio of compound superconducting precursor member (Wb1/Tb1) | Ab1 | — | 2.00 | 4.17 | 6.57 | 10.40 | 2.00 | 4.17 | 6.57 | 10.40 | 1.00 | 1.00 | 1.53 | 1.00 | 1.00 | 1.00 | 1.53 | 1.00 |
| Length of width-direction flat area on most outward layer of precursor wire for compound superconducting wire | W01 | mm | 0.90 | 1.68 | 2.00 | 2.20 | 0.90 | 1.68 | 2.00 | 2.20 | — | — | 0.78 | — | — | — | 0.78 | — |
| Length of thickness-direction flat area on most outward layer of precursor wire for compound superconducting wire | T01 | mm | — | 0.16 | — | — | — | 0.16 | — | — | — | — | 0.30 | — | — | — | 0.30 | — |
| Transverse sectional area of precursor wire for compound superconducting wire | S11 | $mm^2$ | 1.07 | 0.94 | 0.79 | 0.62 | 1.07 | 0.94 | 0.79 | 0.62 | 0.16 | 0.79 | 1.16 | 1.33 | 0.16 | 0.79 | 1.16 | 1.33 |
| Maximum width dimension of portion excluding electrical insulation member from compound superconducting wire | W12 | mm | 1.52 | 2.00 | 2.30 | 2.60 | 1.52 | 2.00 | 2.30 | 2.60 | 0.45 | 1.00 | 1.38 | 1.30 | 0.45 | 1.00 | 1.38 | 1.30 |
| Maximum thickness dimension of portion excluding electrical insulation member from compound superconducting wire | T12 | mm | 0.76 | 0.48 | 0.35 | 0.25 | 0.76 | 0.48 | 0.35 | 0.25 | 0.45 | 1.00 | 0.90 | 1.30 | 0.45 | 1.00 | 0.90 | 1.30 |
| Volume fraction of compound superconducting member | V02 | % | 40 | 40 | 40 | 40 | 40 | 40 | 40 | 40 | 45 | 40 | 40 | 40 | 45 | 40 | 40 | 40 |
| Volume fraction of reinforcing member | V12 | % | 40 | 40 | 40 | 40 | 40 | 40 | 40 | 40 | 35 | 40 | 40 | 40 | 35 | 40 | 40 | 40 |
| Volume fraction of stabilizing member | V22 | % | 20 | 20 | 20 | 20 | 20 | 20 | 20 | 20 | 20 | 20 | 20 | 20 | 20 | 20 | 20 | 20 |
| Width dimension of compound superconducting member | Wb2 | mm | 0.96 | 1.26 | 1.45 | 1.64 | 0.96 | 1.26 | 1.45 | 1.64 | 0.30 | 0.63 | 0.87 | 0.82 | 0.30 | 0.63 | 0.87 | 0.82 |
| Thickness dimension of compound superconducting member | Tb2 | mm | 0.48 | 0.30 | 0.22 | 0.16 | 0.48 | 0.30 | 0.22 | 0.16 | 0.30 | 0.63 | 0.57 | 0.82 | 0.30 | 0.63 | 0.57 | 0.82 |
| Aspect ratio of compound superconducting member (Wb2/Tb2) | Ab2 | — | 2.00 | 4.17 | 6.57 | 10.40 | 2.00 | 4.17 | 6.57 | 10.40 | 1.00 | 1.00 | 1.53 | 1.00 | 1.00 | 1.00 | 1.53 | 1.00 |
| Length of width-direction flat area on most outward layer excluding electrical insulation member of compound superconducting wire | W02 | mm | 1.52 | 2.00 | 2.30 | 2.60 | 1.52 | 2.00 | 2.30 | 2.60 | — | — | 0.78 | — | — | — | 0.78 | — |

TABLE 1-continued

| | | | Example | | | | | | | | Comparative Example | | | | | | | |
|---|---|---|---|---|---|---|---|---|---|---|---|---|---|---|---|---|---|---|
| Item | Symbol | unit | 1A | 2A | 3A | 4A | 1B | 2B | 3B | 4B | 1a | 2a | 3a | 4a | 1b | 2b | 3b | 4b |
| Length of thickness-direction flat area on most outward layer excluding electrical insulation member of compound superconducting wire | T02 | mm | — | 0.16 | — | — | — | 0.16 | — | — | — | — | 0.30 | — | — | — | 0.30 | — |
| Transverse sectional area of compound superconducting wire | S12 | $mm^2$ | 1.07 | 0.94 | 0.79 | 0.62 | 1.07 | 0.94 | 0.79 | 0.62 | 0.16 | 0.79 | 1.16 | | 0.16 | 0.79 | 1.16 | |
| Coil winding method | — | | React-and-Wind (R&W) | | | | Wind-and-React (W&R) | | | | React-and-Wind (R&W) | | | | Wind-and-React (W&R) | | | |
| Thermal treatment bobbin diameter | Dh | mm | 76 | 76 | 76 | 76 | 38 | 38 | 38 | 38 | 76 | 76 | 76 | 76 | 38 | 38 | 38 | 38 |
| Forward bending pulley for advance bending strain application | D1 | mm | 38 | 38 | 38 | 38 | — | — | — | — | 38 | 38 | 38 | 38 | — | — | — | — |
| Reverse bending pulley for advance bending strain application | D2 | mm | None | None | None | None | — | — | — | — | None | None | None | None | — | — | — | - |
| Advance bending strain applied in R&W method | ε_pre-bent | % | 0.63 | 0.40 | 0.29 | 0.21 | — | — | — | — | 0.40 | 0.83 | 0.75 | 1.08 | — | — | — | — |
| Wound diameter during critical current measurement | D3 | mm | 38 | 38 | 38 | 38 | 38 | 38 | 38 | 38 | 38 | 38 | 38 | 38 | 38 | 38 | 38 | 38 |
| Pure bending strain applied in R&W method | ε_pure | % | 0.63 | 0.40 | 0.29 | 0.21 | — | — | — | — | 0.40 | 0.83 | 0.75 | 1.08 | — | — | — | — |
| Critical current @ 14.5T, 4.2K | Ic | A | 151 | 143 | 117 | 96 | 142 | 118 | 97 | 79 | 24 | 27 | 42 | 19 | 21 | 109 | 140 | 191 |
| Critical current density @ 14.5T, 4.2K of compound superconducting member (including Sn diffusion prevention member) | Non-Cu-Jc | A/$mm^2$ | 352 | 380 | 373 | 388 | 332 | 314 | 310 | 320 | 342 | 87 | 90 | 36 | 300 | 348 | 300 | 360 |

The examples and comparative examples are shown in Table 1. Herein, the width dimension Wb1 and the thickness dimension Tb1 of the compound superconducting precursor member, and the width dimension Wb2 and the thickness dimension Tb2 of the compound superconducting member were respectively calculated by the following formulas.

$$Wb1=(V01/100)^{(1/2)}\times W11$$

$$Tb1=(V01/100)^{(1/2)}\times T11$$

$$Wb2=(V02/100)^{(1/2)}\times W12$$

$$Tb2=(V02/100)^{(1/2)}\times T12$$

Examples 1A to 4A and Examples 1B to 4B were superior in windability to a small diameter, and had larger critical current density (Non-Cu-Jc) per transverse sectional area of the compound superconducting member (including Sn diffusion prevention member), compared to Comparative Examples 1a to 4a and Comparative Examples 1b to 3b. The critical current was defined by the energizing current value when applying a magnetic field of 14.5 T in parallel to the wide faces of the compound superconducting wire made into a spiral shape of 38-mm diameter in liquid helium of 4.2 K, and the generated electric field relative to the energizing current becoming 0.1 μV/cm. In particular, Examples 1A to 4A of the compound superconducting wire obtained by the React-and-Wind method had further increased critical current compared to Examples 1B to 4B of the compound superconducting wire obtained by the Wind-and-React method.

In particular, in Examples 1A to 4A, the critical current density per transverse sectional area (non-Cu-Jc value) of the compound superconducting member (including Sn diffusion prevention member) became greater than Comparative Examples 1a to 4a. This indicates that, by increasing the aspect ratio to reduce the thickness dimension of the compound superconducting member, the pure bending strain during winding in a small diameter of 38 mm becomes smaller even after generating a compound superconductor by thermal treating on a bobbin of 76 mm diameter, and it is possible to suppress a decline in non-Cu-Jc value enhanced by the advance bending strain application. Example 2A and Example 2B could drastically enhance the critical current value since the aspect ratio of the compound superconducting wire was large and the transverse sectional area was large, and further, the non-Cu-Jc value improved, although having the same thickness dimension of 0.30 mm for the compound superconducting member as Comparative Example 1a and Comparative Example 1b. On the other hand, in Comparative Example 2a, Comparative Example 3a and Comparative Example 4a applying the React-and-Wind method, the pure bending strain became large, and the non-Cu-Jc declined remarkably more than in Comparative Example 2b, Comparative Example 3b and Comparative Example 4b applying the Wind-and-React method.

Figure 8:
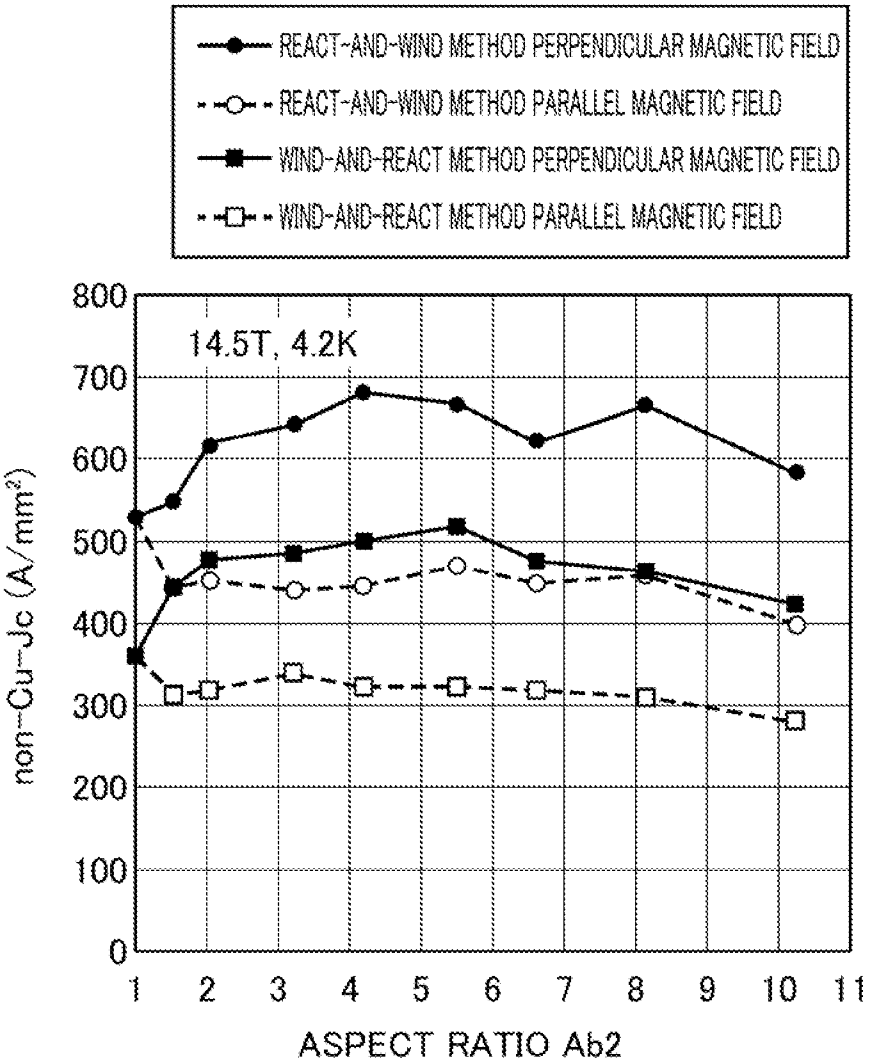
FIG. 8 is a graph showing the relationship between the critical current per transverse sectional area (non-Cu-Jc value) of the compound superconducting member (containing Sn diffusion prevention member) and the aspect ratio Ab2 of the compound superconducting wires obtained by the React-and-Wind method and Wind-and-React method.

Furthermore, the relationship between the aspect ratio Ab2 and the critical current of the compound superconducting wire was investigated. FIG. 8 is a graph showing the relationship between the critical current per transverse sectional area (non-Cu-Jc value, 14.5 T, 4.2 K) of the compound superconducting member (including Sn diffusion prevention member) and the aspect ratio Ab2, for the compound superconducting wires obtained by the React-and-Wind method and the Wind-and-React method.

Based on FIG. 8, in the case of applying a parallel magnetic field to the wide faces of the compound superconducting wire, the React-and-Wind method had a larger value than the Wind-and-React method irrespective of the aspect ratio Ab2, and in either case, there was no big difference in the non-Cu-Jc value in the range of aspect ratio Ab2 on the order of 1.50 to 8.00, and a declining trend was seen at the aspect ratio of 10.40.

On the other hand, in the case of applying a perpendicular magnetic field to the wide faces of the compound superconducting wire, the React-and-Wind method had a larger value than the Wind-and-React method irrespective of the aspect ratio Ab2, and the non-Cu-Jc value of 600 A/mm$^2$ or more was obtained in the range of aspect ratio on the order of 1.80 to 10.40 in the React-and-Wind method; however, in the case of the Wind-and-React method, a close value of 500 A/mm$^2$ was obtained in the range of aspect ratio Ab2 of 1.80 to 6.00. In this way, when the aspect ratio Ab2 of the compound superconducting member is 1.80 or more, in both the React-and-Wind method and the Wind-and-React method, it is possible to achieve a magnifying effect of the above-mentioned non-Cu-Jc, and the aspect ratio Ab2 of the compound superconducting member of 11.00 or more was found to be favorable. In addition, compared to the Wind-and-React method, with the compound superconducting wire obtained by the React-and-Wind method, due to being a high non-Cu-Jc value independently of the magnetic field direction, the compound superconducting wire produced by the React-and-Wind method was found to be able to realize high performance and reasonable coil design by the Wind-and-React method.

Figure 9:
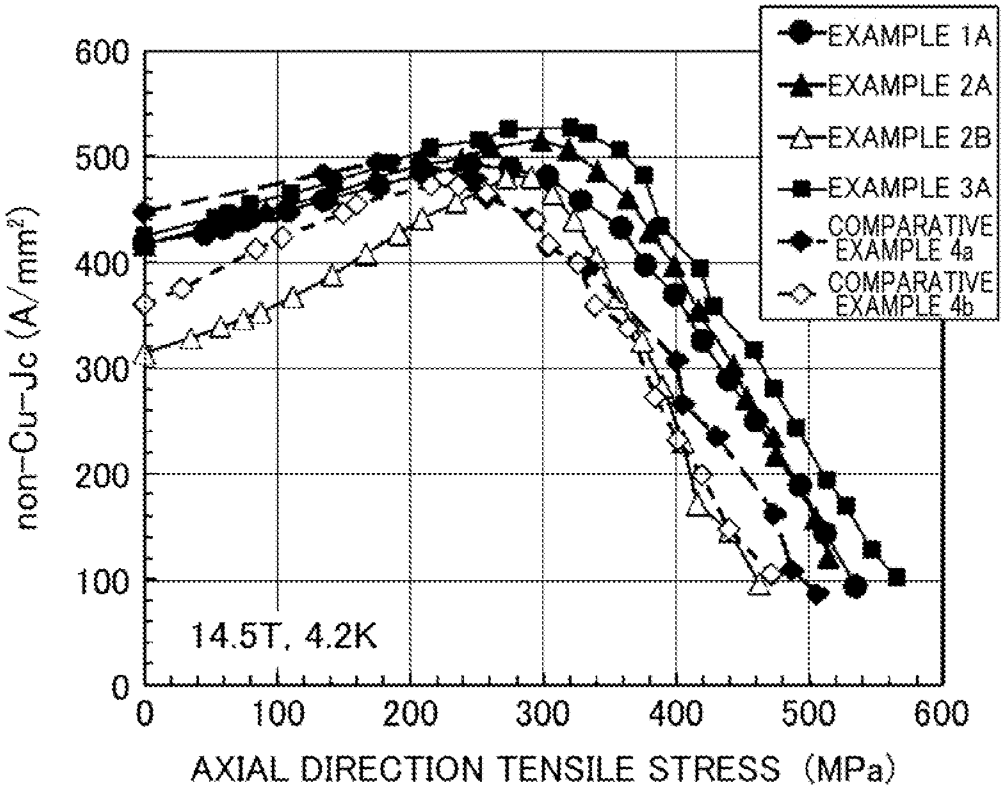
FIG. 9 is a graph showing the critical current per transverse sectional area (non-Cu-Jc value) of the compound superconducting wire relative to the wire axial tensile stress of the compound superconducting wires obtained by the React-and-Wind method and Wind-and-React method.

Furthermore, the relationship between the tensile stress and the critical current value of the compound superconducting wire was investigated. FIG. 9 is a graph showing the non-Cu-Jc value under tensile stress in the wire axial direction for the compound superconducting wires obtained by the React-and-Wind method and the Wind-and-React method. For the samples used herein, after conducting the thermal treatment for compound superconductor generation in a linear shape, the advance bending strain of +/−0.38% was reciprocally applied 10 times at a part of the compound superconductor (including Sn diffusion prevention member) on the sample wire simulating the React-and-Wind method, and on the sample wire simulating the Wind-and-React method, the advance bending strain was not applied immediately after thermal treatment.

As shown in FIG. 9, in the React-and-Wind method, Examples 1A to 3A had larger non-Cu-Jc values with greater aspect ratio Ab2 in the tensile stress range of 250 MPa or greater, compared to Comparative Example 4a. This is considered to be an effect that, by the increase in the aspect ratio Ab2, the uniform bending strain stress came to be applied along the thickness direction of the compound superconducting wire at the advance bending strain application step, and the compressive residual strain of the compound superconducting member was evenly relaxed. On the other hand, in the Wind-and-React method, Example 2B had a larger non-Cu-Jc value over the range from 260 MPa to 340 MPa, compared to Comparative Example 4b. In this way, the enhancement effect of the non-Cu-Jc under the above-mentioned tensile stress became remarkable in the use of the React-and-Wind method, compared to the Wind-and-React method. In this way, for the compound superconducting wire produced in Examples 1A to 4A and 1B to 4B, it was suggested that coil manufacture on a commercial basis is possible.

1 precursor wire for compound superconducting wire
2 compound superconducting wire
10 compound superconducting precursor member
11 compound superconducting precursor filament
12 first matrix precursor
20 compound superconducting member
21 compound superconducting filament
22 first matrix
23 core portion
30 reinforcing member
31 reinforcing filament
32 second matrix
40 stabilizing member
50 Sn diffusion prevention member
60 electrical insulation member
71 first winding member
72 forward bending pulley
73 backward bending pulley
74 second winding member

The invention claimed is:

1. A precursor wire for compound superconducting wire, comprising:

a compound superconducting precursor member configured by a plurality of compound superconducting precursor filaments, and a first matrix precursor embedding the plurality of compound superconducting precursor filaments and including a first stabilizing material;

a cylindrical reinforcing member arranged at the outer circumferential side of the compound superconducting precursor member, and configured by a plurality of reinforcing filaments, and a second matrix embedding the plurality of reinforcing filaments and including a second stabilizing material; and a cylindrical stabilizing member arranged to at least one of the inner circumferential side or outer circumferential side of the reinforcing member, and consisting of a third stabilizing material, wherein an aspect ratio Ab1 (Wb1/Tb1) of a width dimension Wb1 of the compound superconducting precursor member relative to a thickness dimension Tb1 of the compound superconducting precursor member in a cross section perpendicular to a longitudinal direction of the compound superconducting precursor member is 1.80 or more, and the number of the precursor wire for compound superconducting wire is one.

2. The precursor wire for compound superconducting wire according to claim 1, wherein the aspect ratio Ab1 is 11.00 or less.

3. The precursor wire for compound superconducting wire according to claim 1, wherein the aspect ratio Ab1 is 2.00 or more and 10.00 or less.

4. The precursor wire for compound superconducting wire according to claim 1, wherein a total cross-sectional area of a cross-sectional area of the compound superconducting precursor member, cross-sectional area of the reinforcing member and cross-sectional area of the stabilizing member in a cross section perpendicular to the longitudinal direction of the precursor wire for compound superconducting wire is 0.40 $mm^2$ or more and 4.00 $mm^2$ or less.

5. The precursor wire for compound superconducting wire according to claim 1, wherein the plurality of compound superconducting precursor filaments are Nb, and the precursor wire for compound superconducting wire further comprises an Sn diffusion prevention member consisting of Nb or Ta, or an alloy or composite material thereof arranged between the compound superconducting precursor member and the reinforcing member.

6. The precursor wire for compound superconducting wire according to claim 1, wherein the first stabilizing material is copper or a copper alloy, the plurality of reinforcing filaments are one metal selected from the group consisting of Nb, Ta, V, W, Mo, Fe, Ti and Hf, or an alloy configured by two or more of these metals, the second stabilizing material is copper or a copper alloy, and the third stabilizing material is copper or a copper alloy.

7. A compound superconducting wire comprising:

a compound superconducting member configured by a plurality of compound superconducting filaments including a compound superconducting phase, and a first matrix embedding the plurality of compound superconducting filaments and including a first stabilizing material;

a cylindrical reinforcing member arranged at the outer circumferential side of the compound superconducting member, and configured by a plurality of reinforcing filaments, and a second matrix embedding the plurality of reinforcing filaments and including a second stabilizing material; and a cylindrical stabilizing member arranged to at least one of the inner circumferential side or outer circumferential side of the reinforcing member, and consisting of a third stabilizing material, wherein an aspect ratio Ab2 (Wb2/Tb2) of a width dimension Wb2 of the compound superconducting member relative to a thickness dimension Tb2 of the compound superconducting member in a cross section perpendicular to a longitudinal direction of the compound superconducting member is 1.80 or more, and the number of the compound superconducting wire is one.

8. The compound superconducting wire according to claim 7, wherein the aspect ratio Ab2 is 11.00 or less.

9. The compound superconducting wire according to claim 7, wherein the aspect ratio Ab2 is 2.00 or more and 10.00 or less.

10. The compound superconducting wire according to claim 7, wherein a total cross-sectional area of a cross-sectional area of the compound superconducting member, cross-sectional area of the reinforcing member and cross-sectional area of the stabilizing member in a cross section perpendicular to the longitudinal direction of the compound superconducting wire is 0.40 $mm^2$ or more and 4.00 $mm^2$ or less.

11. The compound superconducting wire according to claim 7, wherein the compound superconducting phase is $Nb_3Sn$, and the compound superconducting wire further comprises an Sn diffusion prevention member consisting of Nb or Ta, or an alloy or composite material thereof arranged between the compound superconducting member and the reinforcing member.

12. The compound superconducting wire according to claim 7, wherein the first stabilizing material is copper or a copper alloy, the plurality of reinforcing filaments are one metal selected from the group consisting of Nb, Ta, V, W, Mo, Fe, Ti and Hf, or an alloy configured by two or more of these metals, the second stabilizing material is copper or a copper alloy, and the third stabilizing material is copper or a copper alloy.

13. The compound superconducting wire according to claim 7, further comprising an electrical insulation member containing a resin arranged at an outermost circumference.

14. A method of rewinding the compound superconducting wire according to claim 7, comprising when rewinding the compound superconducting wire from a first winding member to a second winding member, extending the compound superconducting wire from the first winding member in a tangential direction of the first winding member, and winding the compound superconducting wire onto the second winding member while bending in a bending direction which is the same as when being wound onto the first winding member.

* * * * *